(12) United States Patent
Inada et al.

(10) Patent No.: US 7,624,717 B2
(45) Date of Patent: Dec. 1, 2009

(54) INTERNAL-COMBUSTION-ENGINE COMBUSTION CONDITION DETECTION APPARATUS

(75) Inventors: Takahiko Inada, Chiyoda-ku (JP);
Kimihiko Tanaya, Chiyoda-ku (JP);
Koichi Okamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/167,759

(22) Filed: Jul. 3, 2008

(65) Prior Publication Data

US 2009/0084353 A1   Apr. 2, 2009

(30) Foreign Application Priority Data

Oct. 2, 2007   (JP) .............................. 2007-258776

(51) Int. Cl.
*F02P 5/145*    (2006.01)
*G01M 15/04*    (2006.01)

(52) U.S. Cl. .............................. 123/406.12; 73/114.62; 73/114.67

(58) Field of Classification Search ................. 123/634, 123/652, 406.12, 143 R, 406.13, 406.19–406.21, 123/406.27, 406.29, 406.45, 179.5, 146.5 R; 701/101, 102, 111; 73/114.62, 114.67
See application file for complete search history.

(56) References Cited

U.S. PATENT DOCUMENTS

| | | | |
|---|---|---|---|
| 5,178,001 A * | 1/1993 | Ikeuchi et al. ............. | 73/114.62 |
| 5,619,968 A * | 4/1997 | Hillsberg et al. ........ | 123/406.13 |
| 6,246,952 B1 * | 6/2001 | Honda ......................... | 701/111 |
| 6,360,587 B1 * | 3/2002 | Noel .......................... | 73/35.08 |
| 6,615,811 B1 * | 9/2003 | Butler, Jr. ................... | 123/606 |
| 6,779,517 B2 * | 8/2004 | Sakakura ..................... | 123/630 |
| 6,925,374 B2 * | 8/2005 | Matsushita et al. .......... | 701/114 |
| 6,935,302 B2 * | 8/2005 | Kashiwagura et al. ...... | 123/295 |
| 6,994,073 B2 * | 2/2006 | Tozzi et al. .................. | 123/298 |
| 7,013,871 B2 * | 3/2006 | Zhu et al. .............. | 123/406.21 |
| 7,467,626 B2 * | 12/2008 | Naruse et al. ................ | 123/605 |
| 2005/0056254 A1 * | 3/2005 | Wozniak et al. ......... | 123/406.13 |

FOREIGN PATENT DOCUMENTS

JP    63-068774 A    3/1988

* cited by examiner

*Primary Examiner*—Stephen K Cronin
*Assistant Examiner*—Johnny H Hoang
(74) *Attorney, Agent, or Firm*—Sughrue Mion, PLLC

(57) ABSTRACT

An internal-combustion-engine combustion condition detection apparatus that can accurately comprehend a combustion condition is obtained. The internal-combustion-engine combustion condition detection apparatus includes an ion-current detection device (41) that detects an ion current generated during combustion and ignition devices including a first ignition device (21) having a first ignition plug (11) that causes main combustion in a combustion chamber (33) and a second ignition device (22) having a second ignition plug (12) disposed in the same combustion chamber (33) as and spaced apart from the first ignition plug (11) of the first ignition device (21); the ion-current detection device (41) detects a combustion ion current that is generated in the second ignition device (22) regardless of whether or not ignition is performed by the second ignition device (22), thereby detecting pre-ignition or a precursor phenomenon of pre-ignition.

18 Claims, 17 Drawing Sheets

INTERNAL-COMBUSTION-ENGINE COMBUSTION CONDITION DETECTION APPARATUS

BACKGROUND OF THE INVENTION

1. Field of the Invention

The present invention relates to an internal-combustion-engine combustion condition detection apparatus that detects pre-ignition caused, for example, in an internal combustion engine having a plurality of ignition plugs in a single combustion chamber, based on an ion current produced by combustion or on an ignition discharge time. Based on the detection, the internal-combustion-engine combustion condition detection apparatus suppresses pre-ignition so as to maintain the combustion in a good condition.

2. Description of the Related Art

In recent years, a multipoint-ignition internal combustion engine has been put to practical use in which ignition is performed by a plurality of ignition plugs provided in a single combustion chamber so that the speed of combustion in the combustion chamber is accelerated and the combustion can be maintained in a good condition. Additionally, it is tendency that a high compression ratio is employed in an internal combustion engine. Under such a condition of high compression, the temperature of the inside of the combustion chamber increases, and in a locally overheated portion, a fuel-air mixture spontaneously ignites earlier than the normal ignition timing, whereby pre-ignition occurs. The occurrence of pre-ignition causes a poor driving condition, and in extreme cases, melting loss of an ignition plug or a piston may be caused. Therefore, in Japanese Patent Laid-Open No. 1988-68774, a technology is proposed in which pre-ignition is determined by means of an ion current that flows across ignition-plug electrodes.

Additionally, it is known that, by detecting a precursor phenomenon (post-ignition), of pre-ignition, in which, in a locally overheated portion, a fuel-air mixture spontaneously ignites at an early stage after the normal ignition timing, pre-ignition through which melting loss of an ignition plug or a piston is caused can be prevented.

FIG. 17 is a configuration diagram illustrating a conventional internal-combustion-engine combustion condition detection apparatus that detects an ion current. Reference numeral 2 denotes an ignition device having an ignition plug 1, disposed in a combustion chamber. In the ignition device 2, when a transistor 36 is controlled by an ECU (Electronic Control Unit) 42 to be turned off, counter electromotive force is produced across a primary coil 31; in response to the occurrence of the counter electromotive force, a negative high voltage is produced across a secondary coil 32, whereby the ignition plug 1 discharges.

After that, when a fuel-air mixture in a combustion chamber 33 combusts, an ion-current detection device 41 detects an ion current that is caused by the combustion and flows across the electrodes of the ignition plug 1. Next, in order to raise noise immunity, an ion current shaping unit 43 provided in the ion-current detection device 41 applies waveform shaping, such as constant multiplication processing, to the ion current, and then the wave-shaped ion current is inputted to the ECU 42. In order to comprehend the driving condition of the internal combustion engine, the outputs of various kinds of sensors 44 such as an air-intake temperature sensor, a throttle sensor, a crank angle sensor, and a water temperature sensor are inputted to the ECU 42.

The ion-current detection device 41 includes a biasing device connected to the low-voltage end of the secondary coil 32 in the ignition device 2, i.e., a capacitor 45, a diode 46 inserted between the capacitor 45 and the ground, and a voltage-limiting zener diode 47 connected in parallel with the capacitor 45 and the diode 46 that are connected in series to each other. A series circuit consisting of the capacitor 45 and the diode 46 and the zener diode 47 connected in parallel with the series circuit are inserted between the low-voltage end of the secondary coil 32 and the ground so as to configure a charging path for charging a biasing voltage across the capacitor 45 when an ignition current is produced.

The capacitor 45 is charged with a secondary current that flows through the discharging ignition plug 1 due to a high voltage outputted from the secondary coil 32 when the transistor 36 is turned off. The charging voltage is limited by the zener diode 47 to a predetermined biasing voltage (e.g., several hundreds volts) and functions as a biasing device, i.e., a power source for detecting an ion current.

Accordingly, in the case where, with the foregoing configuration, electric charges are accumulated while ignition discharge is performed and then a combustion ion current is detected, it is impossible to detect an ion current while ignition discharge is performed; therefore, the ion current represented by the broken line in FIG. 3 cannot be detected, and only the ion current represented by the solid line is detected. In the case of a driving condition, such as pre-ignition or a precursor phenomenon of pre-ignition, in which the combustion speed is high, most of ion current information may be produced during a discharge time; thus, it is difficult to accurately comprehend the combustion condition by means of a combustion ion current.

Moreover, in the case where, in an internal combustion engine having a plurality of ignition plugs in a single combustion chamber illustrated in FIG. 1, a flame propagation time from a time instant when the ignition plug 11 ignites a fuel to a time instant when an ion current in an ignition plug 12 is detected, i.e., a combustion speed is tried to be measured, it has been a problem that, in the case where both the ignition plugs 11 and 12 concurrently ignite the fuel, respective combustion ion currents, as ion currents 1 and 2 represented in FIG. 3, are produced approximately at the same time due to discharge of the ignition devices, whereby the flame propagation time cannot accurately be measured.

SUMMARY OF THE INVENTION

The present invention has been implemented in order to solve the foregoing problems, and the objective thereof is to provide an internal-combustion-engine combustion condition detection apparatus that utilizes a multipoint ignition system or a single-point ignition system and can accurately comprehend a combustion condition, or an internal-combustion-engine combustion condition detection apparatus that can accurately comprehend a combustion condition and can maintain a combustion in a good condition.

An internal-combustion-engine combustion condition detection apparatus according to the present invention is provided with first and second ignition devices each having an ignition plug that ignites a fuel-air mixture taken in for performing combustion when an internal combustion engine is operated, the first ignition device including a first ignition plug that causes main combustion in a combustion chamber, and the second ignition device including a second ignition plug that is disposed in the same combustion chamber as the first ignition plug of the first ignition device, spaced apart from the first ignition plug; an ignition control device that generates a control signal for controlling operations of the ignition devices; an ion-current detection device that detects an ion current generated during combustion; and a pre-ignition detection device that detects pre-ignition or a precursor phenomenon of pre-ignition, based on an ion current detected by the ion-current detection device. The ion-current detection device detects a combustion ion current that is generated in the second ignition device regardless of whether or not ignition is performed by the second ignition device, thereby detecting pre-ignition or a precursor phenomenon of pre-ignition.

An internal-combustion-engine combustion condition detection apparatus according to the present invention is provided with first and second ignition devices each having an ignition plug that ignites a fuel-air mixture taken in for performing combustion when an internal combustion engine is operated, the first ignition device including a first ignition plug that causes main combustion in a combustion chamber, and the second ignition device including a second ignition plug that is disposed in the same combustion chamber as the first ignition plug of the first ignition device, spaced apart from the first ignition plug; an ignition control device that generates a control signal for controlling operations of the ignition devices; an ion-current detection device that detects an ion current generated during combustion; a detection range setting device that sets an ion-current detection range; and a pre-ignition detection device that detects pre-ignition or a precursor phenomenon of pre-ignition, based on an ion current detected by the ion-current detection device, the ion current being within a detection range set by the detection range setting device. The ion-current detection device detects a combustion ion current that is generated in the second ignition device regardless of whether or not ignition is performed by the second ignition device, thereby detecting pre-ignition or a precursor phenomenon of pre-ignition.

In an internal-combustion-engine combustion condition detection apparatus according to the present invention, ignition devices include a first ignition device having a first ignition plug that causes main combustion in a combustion chamber and a second ignition device having a second ignition plug disposed in the same combustion chamber as and spaced apart from the first ignition plug of the first ignition device, and the ion-current detection device detects a combustion ion current that is generated in the second ignition device regardless of whether or not ignition is performed by the second ignition device, thereby detecting pre-ignition or a precursor phenomenon of pre-ignition; therefore, the combustion condition of an internal combustion engine can accurately be comprehended.

In summary, under a driving condition in which the combustion in an internal combustion engine is required to be maintained in a good condition, the combustibility can be raised, and under a driving condition in which pre-ignition is likely to be produced, the detectability for pre-ignition or a precursor phenomenon of pre-ignition can be raised.

Moreover, an internal-combustion-engine combustion condition detection apparatus according to the present invention is provided with an ignition device having an ignition plug that ignites a fuel-air mixture taken in for performing combustion when an internal combustion engine is operated; an ignition control device that generates a control signal for controlling operations of the ignition devices; a discharge time detection device that detects a spark discharge time of a spark produced upon combustion through the ignition device; a comparison level setting means that sets a comparison level to be compared with a spark discharge time detected by the discharge time detection device (81); and a discharge determination means that determines whether or not pre-ignition or a precursor phenomenon of pre-ignition has been produced, based on the result of a comparison between the spark discharge time and the comparison level. In the case where the spark discharge time detected by the discharge time detection device is shorter than the comparison level, the discharge determination means determines that pre-ignition or a precursor phenomenon of pre-ignition has been produced.

Still moreover, an internal-combustion-engine combustion condition detection apparatus according to the present invention is provided with first and second ignition devices each having an ignition plug that ignites a fuel-air mixture taken in for performing combustion when an internal combustion engine is operated, the first ignition device including a first ignition plug that causes main combustion in a combustion chamber, and the second ignition device including a second ignition plug that is disposed in the same combustion chamber as the first ignition plug of the first ignition device, spaced apart from the first ignition plug; an ignition control device that generates a control signal for controlling operations of the ignition devices; a discharge time detection device that detects a spark discharge time of a spark produced upon combustion through the ignition device; a comparison level setting means that sets a comparison level to be compared with a spark discharge time detected by the discharge time detection device; and a discharge determination means that determines whether or not pre-ignition or a precursor phenomenon of pre-ignition has been produced, based on the result of a comparison between the spark discharge time and the comparison level. The discharge time detection device detects an spark discharge time of a spark produced by the first ignition device or the second ignition device, and in the case where the spark discharge time detected by the discharge time detection device is shorter than the comparison level, the discharge determination means determines that pre-ignition or a precursor phenomenon of pre-ignition has been produced.

In an internal-combustion-engine combustion condition detection apparatus according to the present invention, in the case where the spark discharge time detected by the discharge time detection device is shorter than the comparison level, the discharge determination means determines that pre-ignition or a precursor phenomenon of pre-ignition has been produced; therefore, the combustion condition of an internal combustion engine can accurately be comprehended.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiments of the present invention will be explained below.

Embodiment 1

Figure 1:
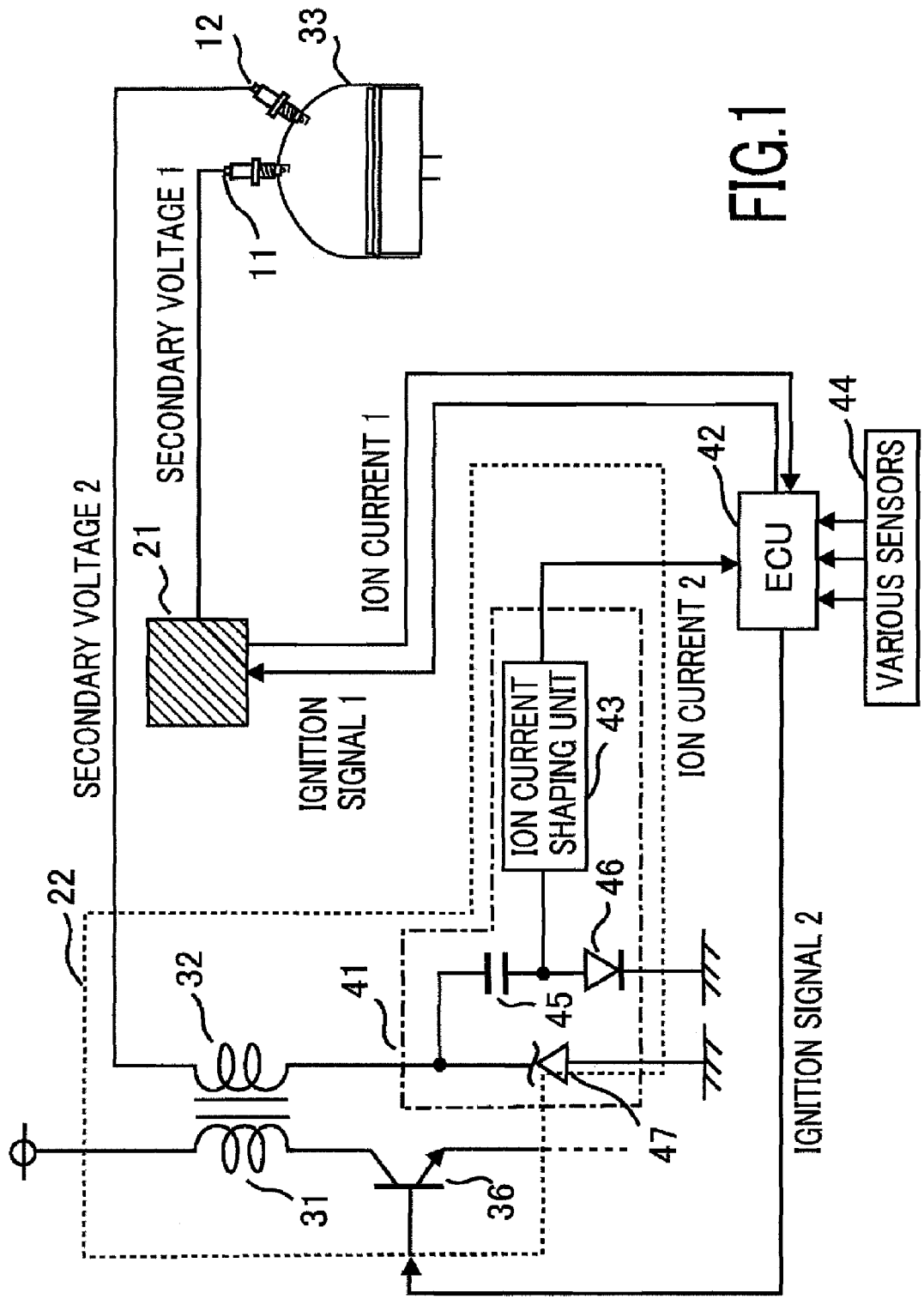
FIG. 1 is a configuration diagram illustrating an internal-combustion-engine combustion condition detection apparatus according to Embodiment 1 of the present invention.

FIG. 1 is a configuration diagram illustrating an internal-combustion-engine combustion condition detection apparatus according to Embodiment 1 of the present invention, illustrated in FIG. 1, a first ignition plug 11 is disposed in the vicinity of the middle portion of a combustion chamber and a second ignition plug 12 is disposed, spaced apart from the first ignition plug 11, in the peripheral portion of the combustion chamber. Because, in Embodiment 1, the speed of flame propagation from the ignition plug 11 to the ignition plug 12 is detected based on a combustion ion current so that pre-ignition or a precursor phenomenon of pre-ignition is determined; therefore, it is desirable to arrange the ignition plug 11 and the ignition plug 12 spaced apart from each other by a certain distance (e.g., 3 cm to 4 cm). In addition, a case will be explained in which two ignition plugs are provided in a single cylinder; however, the internal-combustion-engine combustion condition detection apparatus according to Embodiment 1 may be applied to an internal combustion engine in which two or more ignition plugs are provided in a single combustion chamber.

Figure 4:
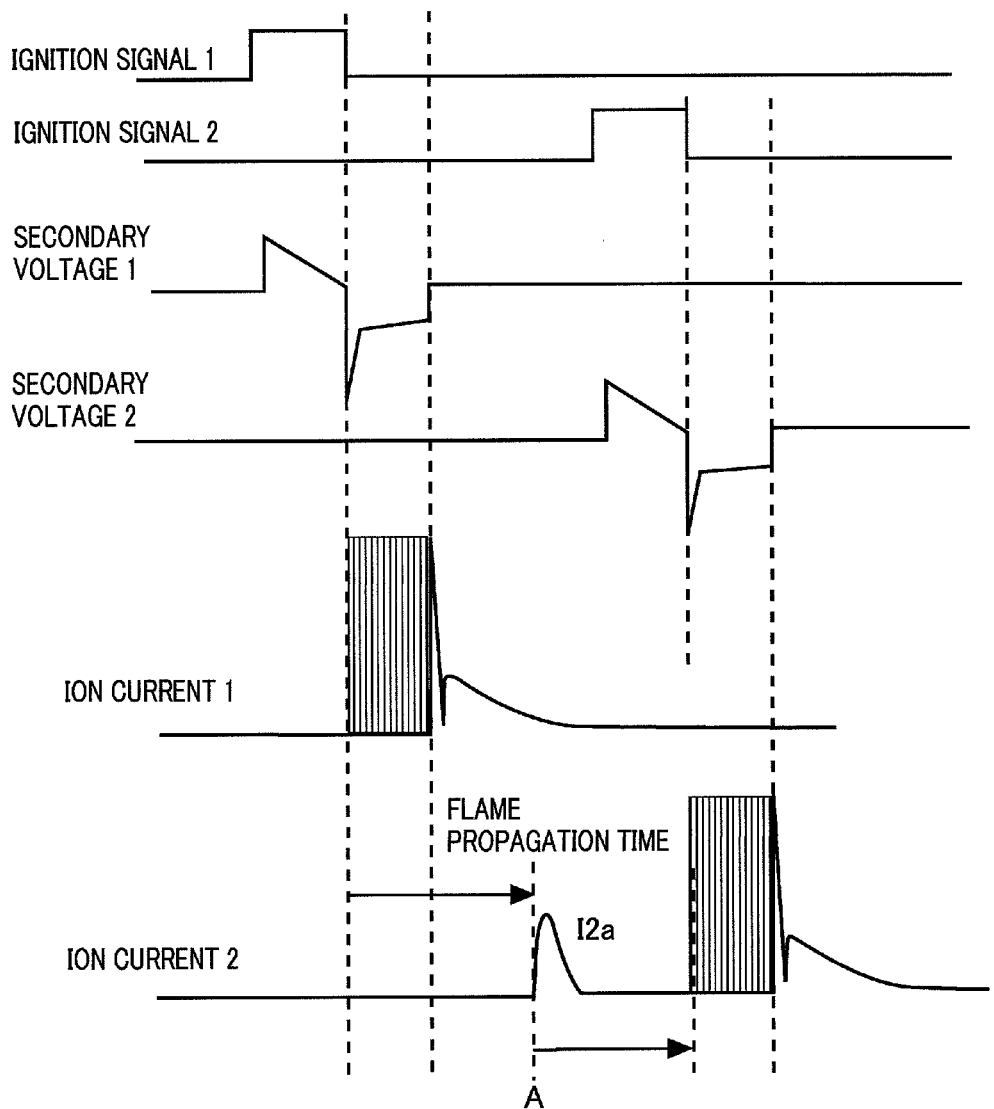
FIG. 4 is a waveform chart for explaining an operation of Embodiment 1 in the case of different-phase ignition.

A first ignition device 21 has the first ignition plug 11. A second ignition device 22 has the second ignition plug 12. The respective operations and configurations of the ignition devices 21 and 22 are the same as those of the ignition device 2 explained with reference to FIG. 17; a negative high voltage represented in FIG. 4 is produced, whereby the ignition plugs 11 and 12 discharge. However, because, in Embodiment 1, the ignition device 21 does not necessarily require the ion-current detection device 41, an ignition device without any ion-current detection device may be utilized in order to reduce the cost.

Figure 17:
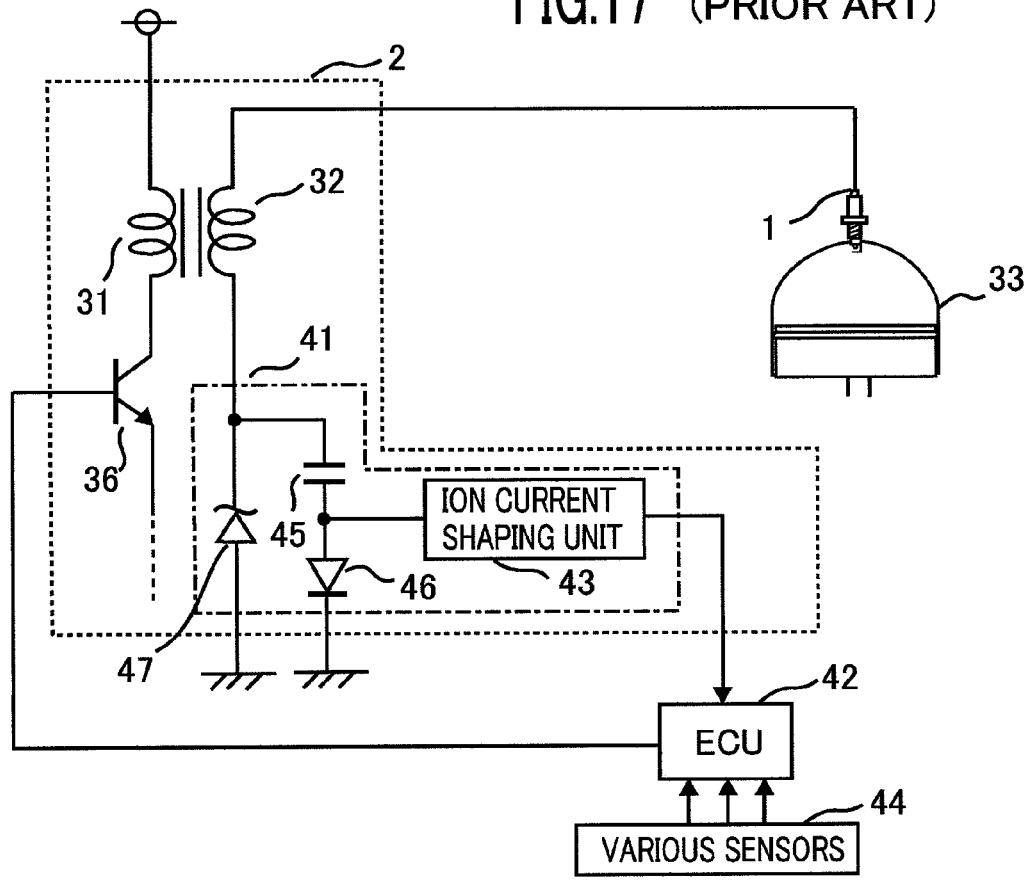
FIG. 17 is a configuration diagram illustrating a conventional internal-combustion-engine combustion condition detection apparatus.

After that, when a fuel-air mixture in a combustion chamber 33 combusts, the ion-current detection device 41 explained with reference to FIG. 17 detects ion currents that flow across the respective electrodes of the ignition plugs 11 and 12. In this example, the ion-current detection device 41 is disposed in the ignition device 22 so as to be arranged in the same package as the ignition device 22. The ion-current detection device 41 may be disposed in the ECU 42. In this case, an ion current is detected in the ECU 42, based on the ion current that flows in the ignition device. Additionally, the ion-current detection device 41 may be arranged in the same package as an ignition control device (that exists, e.g., in the ECU). Similarly, a pre-ignition detection device (that exists, e.g., in the ECU) may be arranged in the same package as the ignition device or the ignition control device.

Next, in order to raise noise immunity, the ion current shaping unit 43 provided in the ion-current detection device 41 applies waveform shaping, such as a constant multiplication processing, to the ion current, and then the wave-shaped ion current is inputted to the ECU 42. The internal-combustion-engine combustion condition detection apparatus according to Embodiment 1 may be configured in such a way that the wave-shaped ion current is inputted to a module including another MPU (Micro Processor Unit) or a signal processing circuit, instead of being inputting to the ECU 42, and then the signal-processed ion current is inputted to the ECU 42. Additionally, in order to comprehend the driving condition of the internal combustion engine, the outputs of the various kinds of sensors 44 such as an air-intake temperature sensor, a throttle sensor, a crank angle sensor, and a water temperature sensor are inputted to the ECU 42.

Figure 2:
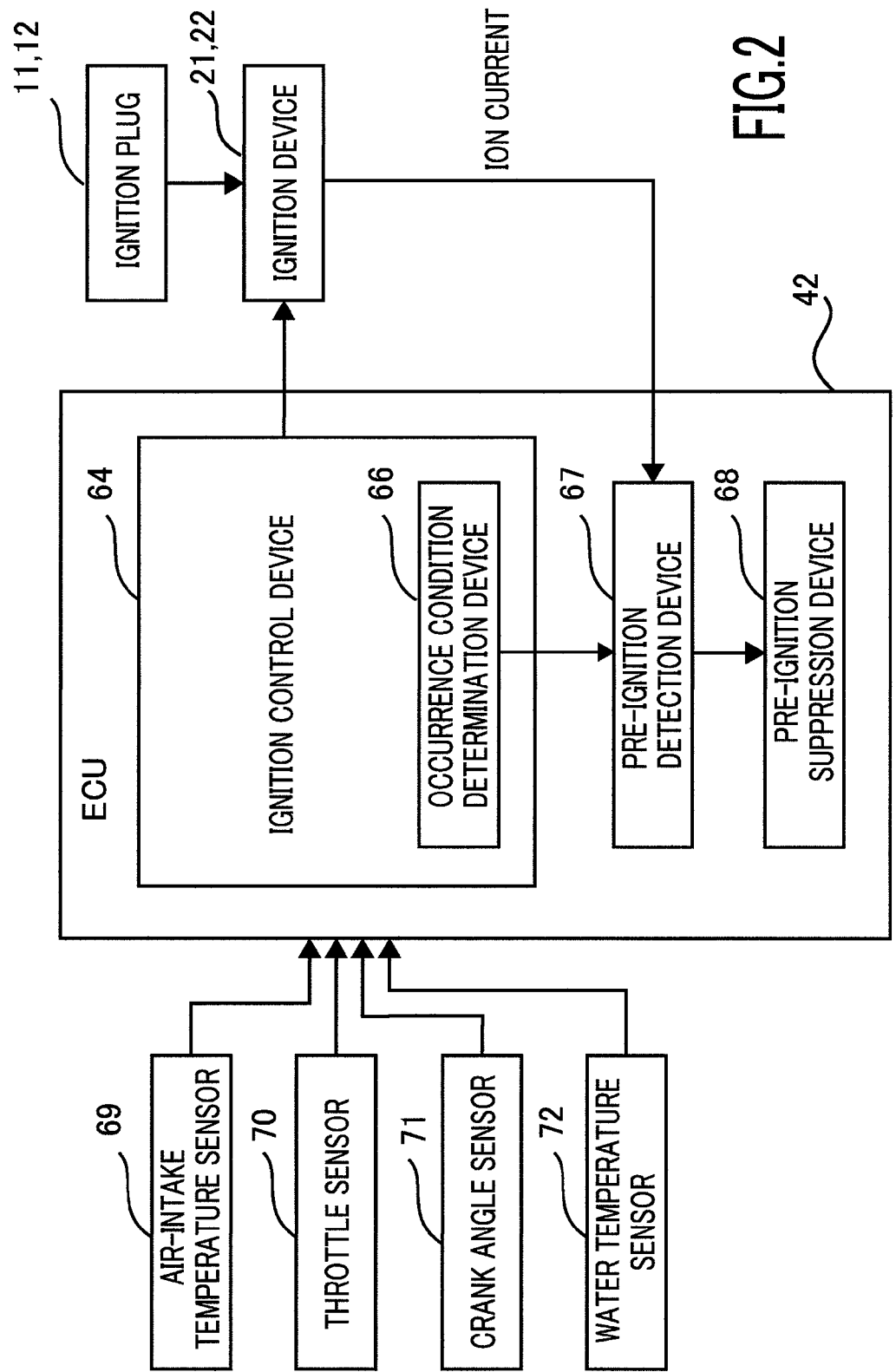
FIG. 2 is a functional configuration diagram illustrating an internal-combustion-engine combustion condition detection apparatus according to Embodiment 1.

Next, the operation of Embodiment 1 will be explained with reference to FIG. 2. Respective ignition control signals are inputted from an ignition control device 64 to the ignition devices 21 and 22, and the ignition plugs 11 and 12 discharge based on the ignition control signals.

Based on information items, from an air-intake temperature sensor 69, a throttle sensor 70, a crank angle sensor 71, a water temperature sensor 72, and the like, that are inputted to the ECU 42, an occurrence condition determination device 66 included in the ignition control device 64 determines whether or not the present condition is a condition under which pre-ignition is likely to occur. The operation of the occurrence condition determination device 66 will be explained with reference to FIG. 7.

Figure 7:
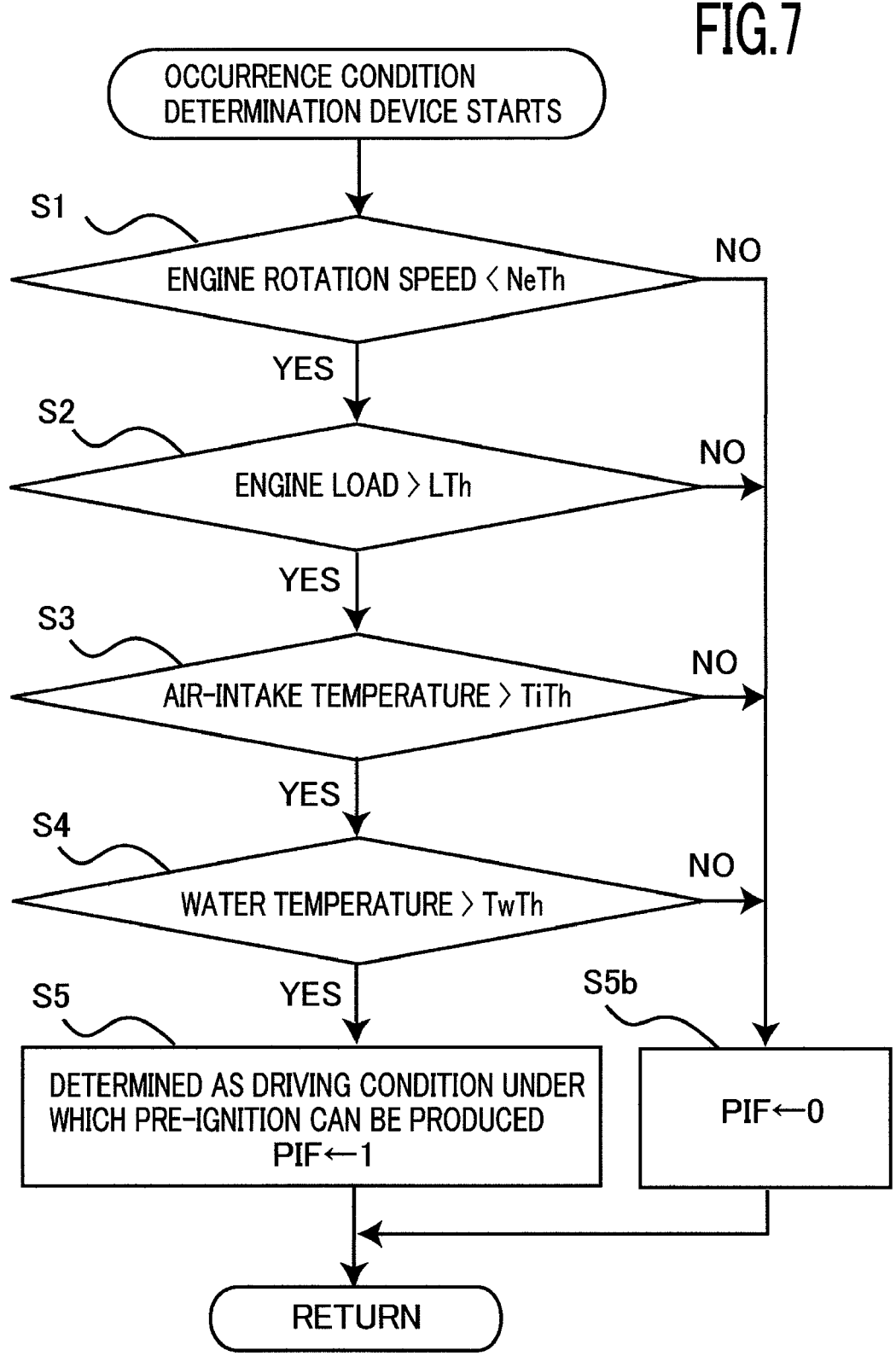
FIG. 7 is a flowchart representing the operation of an occurrence condition determination device utilized in an internal-combustion-engine combustion condition detection apparatus according to Embodiment 1.

In the case where, in the step S1 in FIG. 7, it is determined that an engine rotation speed calculated based on information that is obtained from the crank angle sensor 71 and inputted to the ECU 42 is lower than a predetermined rotation speed Neth, the step S1 is followed by the step S2. In the case where, in the step S2, it is determined that an engine load calculated based on information that is obtained from the throttle sensor

70 is larger than a predetermined load LTh, the step S2 is followed by the step S3. In the case where, in the step S3, it is determined that an air-intake temperature calculated based on information that is obtained from the air-intake temperature sensor 69 is higher than a predetermined temperature TiTh, the step S3 is followed by the step S4. In the case where, in the step S4, it is determined that a water temperature calculated based on information that is obtained from the water temperature sensor 72 is higher than a predetermined temperature TwTh, the step S4 is followed by the step S5, where it is determined that the present condition is a driving condition in which pre-ignition can be produced, and "1" is substituted into PIF. For example, it is desirable that NeTh, Lth, TiTh, and TwTh are set to 1500 r/m, a full open load value for each rotation speed, 50° C., and 80° C., respectively. In the case where, in each of the steps S1 to S4, the foregoing condition is not satisfied, "0" is substituted into PIF in the step S5b. A plurality of threshold values utilized for condition determination in each of the steps S1 to S4 may be provided so as to provide levels for the driving conditions in which pre-ignition can be produced.

Figure 9:
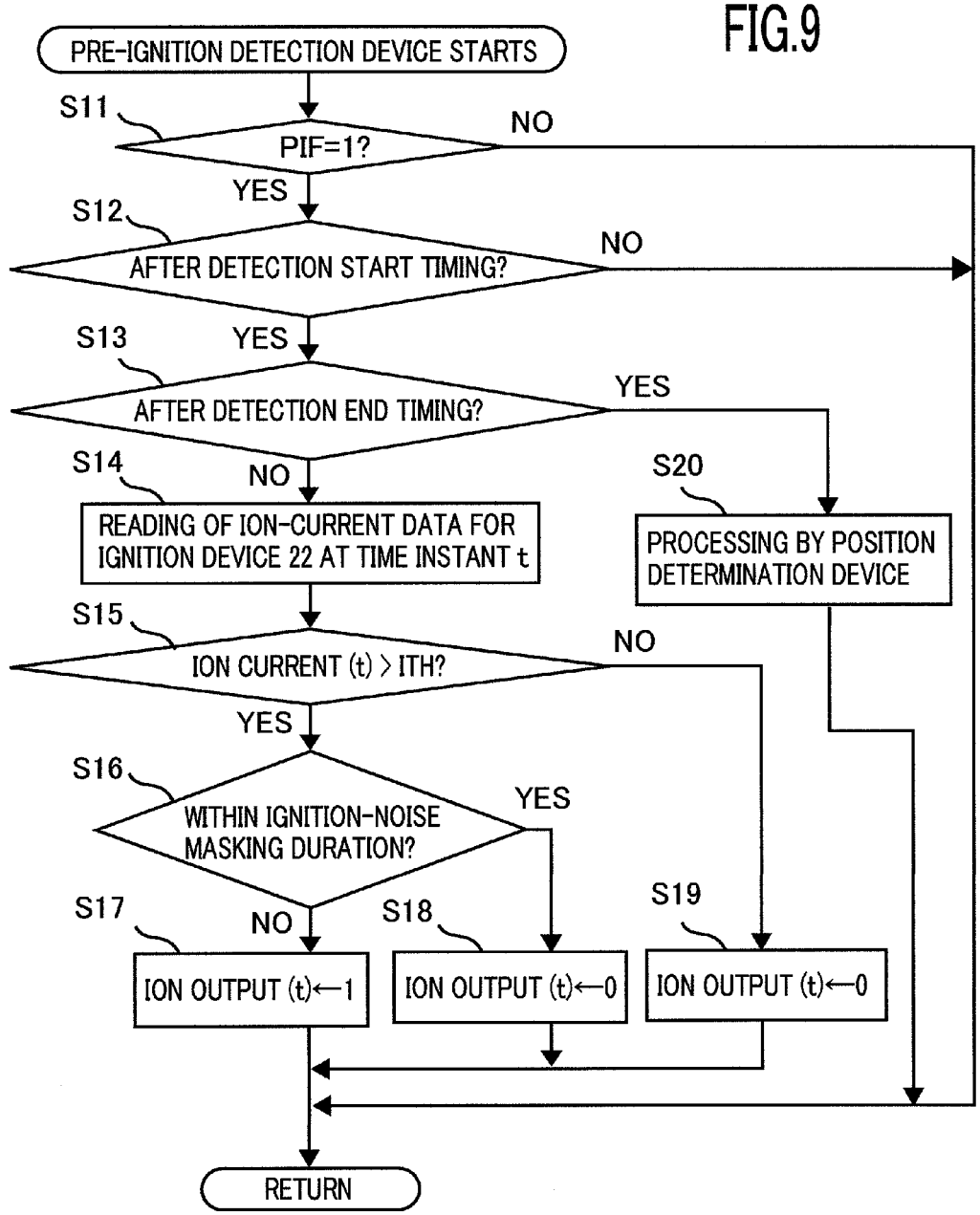
FIG. 9 is a flowchart representing the operation of a pre-ignition detection device utilized in an internal-combustion-engine combustion condition detection apparatus according to Embodiment 1.

Next, under the driving condition (PIF=1) that is determined by the occurrence condition determination device 66 to be a driving condition in which pre-ignition can be produced, the ignition control device 64 obtains basic ignition timings for the ignition devices 21 and 22 from a basic ignition timing MAP based on driving conditions such as a rotation speed and a load, and then delays the angle corresponding to the ignition timing for the ignition device 22 with respect to the angle corresponding to the ignition timing for the ignition device 21; in the case where PIF=0, the operation of delaying the angle corresponding to an ignition timing is prohibited. Additionally, as represented in FIG. 9, because the step S11 is not satisfied, a pre-ignition detection device 67 does not operate (the step S11 is followed by "RETURN").

Figure 8:
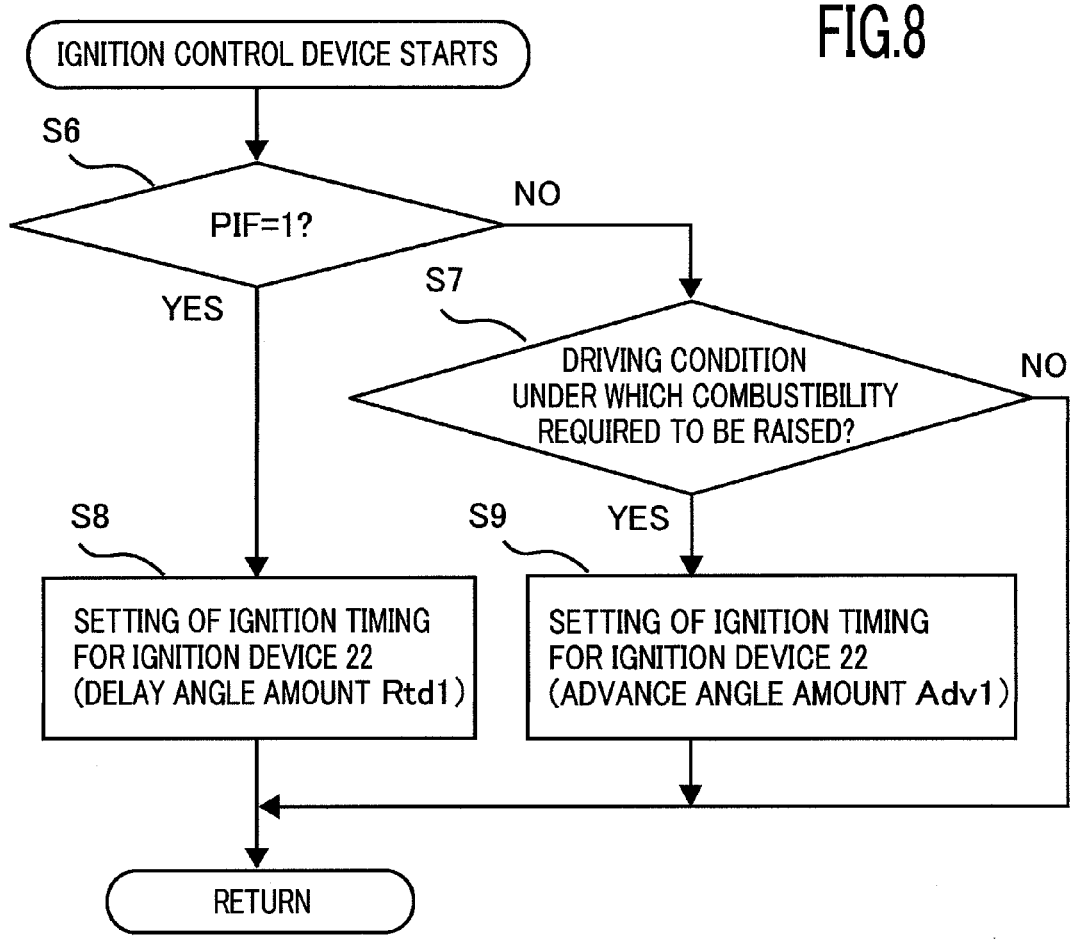
FIG. 8 is a flowchart representing the operation of an ignition control device utilized in an internal-combustion-engine combustion condition detection apparatus according to Embodiment 1.

As represented in FIG. 4, by delaying the angle corresponding to an ignition timing under a driving condition in which it is determined that pre-ignition can be produced, the time of flame propagation due to ignition through the ignition plug 11 or spontaneous ignition in the combustion chamber can be measured based on an ion current I2a detected in the ignition plug 12 prior to the ignition by the ignition plug 12. When pre-ignition or a precursor phenomenon of pre-ignition is produced, the pressure in the combustion chamber is high and the ignition timing is advanced. Accordingly, because the flame propagation time is accelerated, the timing when the ion current I2a is produced is also advanced. The operation of the ignition control device 64 will be explained in detail with reference to FIG. 8.

In the step S6, it is determined whether or not PIF=1, which suggests that the present driving condition is determined to be a driving condition under which pre-ignition can be produced, is satisfied In the case where the foregoing condition is satisfied, the step S6 is followed by the step S8, where the angle corresponding to the ignition timing for the ignition device 22 is delayed by a delay angle amount Rtd1 with respect to the angle corresponding to the ignition timing for the ignition device 21. The delay angle amount Rtd1 is obtained from a basic ignition timing MAP based on driving conditions such as a rotation speed and a load. In contrast, in the case where the foregoing condition is not satisfied, the step S6 is followed by the step S7, where it is determined whether or not the present driving condition is a driving condition under which it is desirable to raise the combustibility. In the case where the foregoing condition is satisfied, the step S7 is followed by the step S9, where the angle corresponding to the ignition timing for the ignition device 22 is advanced so as to be close to the angle corresponding to the ignition timing for the ignition device 21. As is the case with the delay angle amount Rtd1, an advance angle amount Adv1 is obtained from a basic ignition timing MAP based on driving conditions. However, in the case where the ignition timings for the ignition device 21 and 22 are the same, no angle advancement is required.

Additionally, in general, by largely delaying the angle corresponding to the ignition timing for the ignition device 22 with respect to the angle corresponding to the ignition timing for the ignition device 21, for example, by delaying the angle corresponding to the ignition timing for the ignition device 22 up to the termination timing of the combustion stroke in the cylinder or by making the ignition device 22 ignite a fuel in the exhaust stroke or in the air-intake stroke of the following cycle so as to set the ignition timing for the ignition device 22 within a range in which the ignition device 22 does not contribute to the combustion in the ignition device 21, the range in which the ignition plug 12 has no effect on ignition and the time of flame propagation due to ignition by the ignition plug 11 or spontaneous ignition in the combustion chamber can be measured spreads, regardless of whether or not a driving condition under which pre-ignition can be produced is satisfied; thus, the detecting accuracy for pre-ignition or a precursor phenomenon of pre-ignition is raised.

In particular, in the case of a driving condition under which the transfer time from the time instant of a precursor phenomenon of pre-ignition to the time instant of pre-ignition is short, it is required to accurately determine a precursor phenomenon of pre-ignition by accurately measuring the flame propagation time. In the case where the occurrence condition determination device 66 determines that the present driving condition is the foregoing driving condition, the angle corresponding to the ignition timing for the ignition device 22 may largely be delayed (the delay angle amount Rtd1 in the step S8 represented in FIG. 8 may be enlarged) with respect to the angle corresponding to the ignition timing for the ignition device 22, by delaying the angle corresponding to the ignition timing for the ignition device 22 up to the termination timing of the combustion stroke in the cylinder or by making the ignition device 22 ignite a fuel in the exhaust stroke or in the air-intake stroke of the following cycle, i.e., by setting the ignition timing for the ignition device 22 within a range in which the ignition device 22 does not contribute to the combustion in the ignition device 21. In contrast, in the case where the occurrence condition determination device 66 does not determine that the present driving condition is the foregoing driving condition, it is not required to perform the angle delaying operation.

Meanwhile, in the case where the occurrence condition determination device 66 determines that the present driving condition is a driving condition under which pre-ignition can be produced and while the combustibility is raised, a precursor phenomenon of pre-ignition is determined, the angle corresponding to the ignition timing for the ignition device 22 is set in such a way as to be slightly delayed with respect to the angle corresponding to the ignition timing for the ignition device 21. With regard to the delay angle amount in this case, the distribution of the occurrence positions of ion currents at the time instant when a precursor phenomenon of pre-ignition occurs is ascertained, and in the case where the starting point of the distribution is indicated by A in FIG. 4, the ignition timing for the ignition device 22 is set to a timing behind the starting point A. It is desirable to utilize, as a basic ignition timing MAP, an ignition timing obtained by adding a certain margin to the starting point A.

As a result, in contrast to a case in which the angle corresponding to the ignition timing for the ignition device 22 is largely delayed with respect to the angle corresponding to the ignition timing for the ignition device 22, the ignition timing for the ignition device 22 can be set to a timing at which the ignition device 22 contributes to combustion; therefore, not only the combustion speed is raised, thereby enhancing the combustibility, but also a precursor phenomenon of pre-ignition can be detected. Because the foregoing method can be implemented regardless of whether or not a driving condition under which pre-ignition can be produced is satisfied, the same effect can be expected; however, in the case where a driving condition under which pre-ignition can be produced is not satisfied, it is not required to implement the foregoing method.

Figure 5:
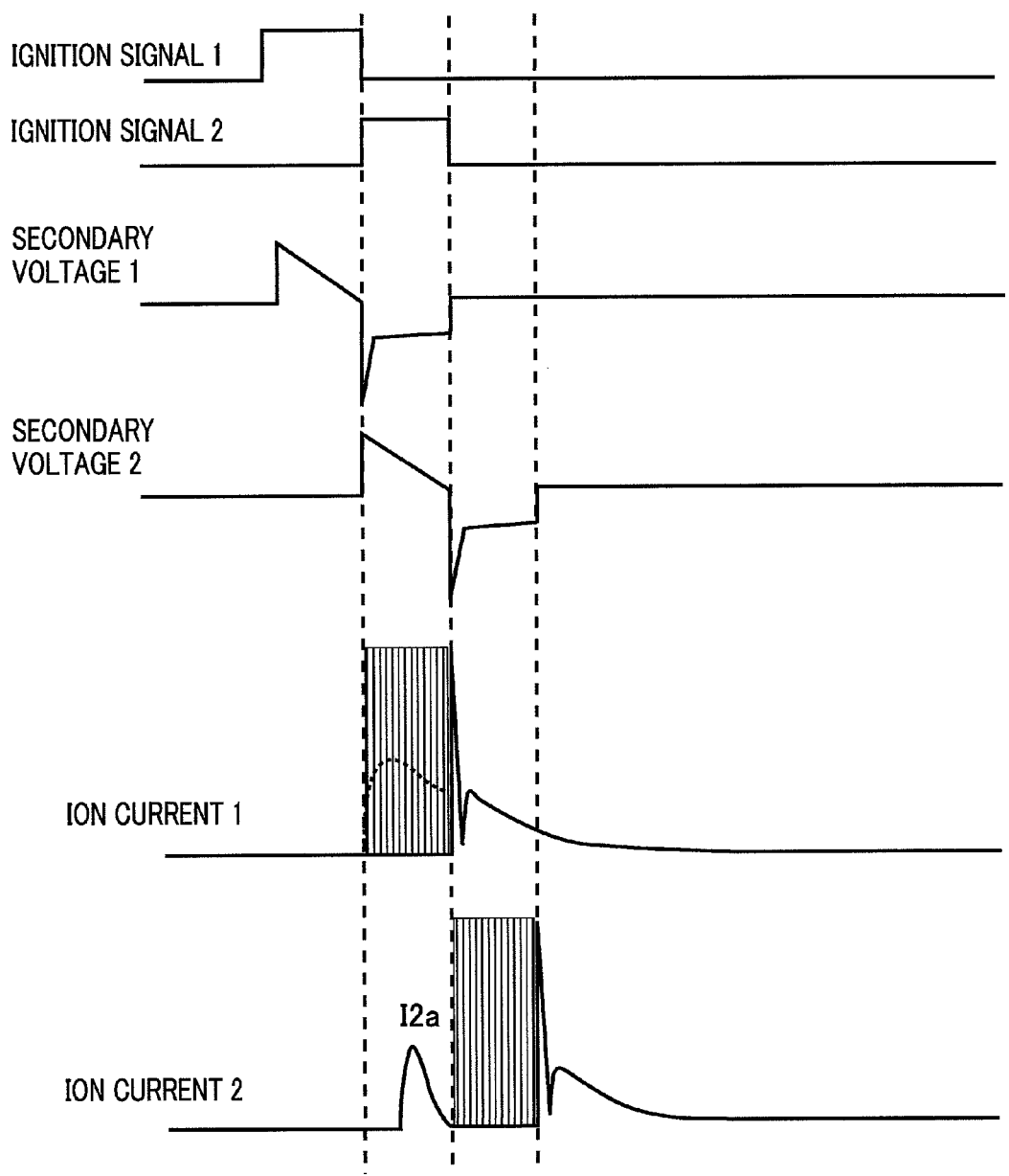
FIG. 5 is a waveform chart for explaining an operation of Embodiment 1 in the case where ignition is executed at a time instant when a discharge ends.

As another example of setting of the ignition timing for the ignition device 22, a method represented in FIG. 5 is conceivable. In the case where pre-ignition or a precursor phenomenon of pre-ignition is produced, the combustion speed is high; thus, most of ion current information obtained through the ignition of the ignition plug 11 may occur while the ignition device 21 discharges. Accordingly, as represented in FIG. 5, the ignition control device 64 sets the ignition timing for the ignition device 22 at a discharge termination timing of the ignition device 21.

Figure 6:
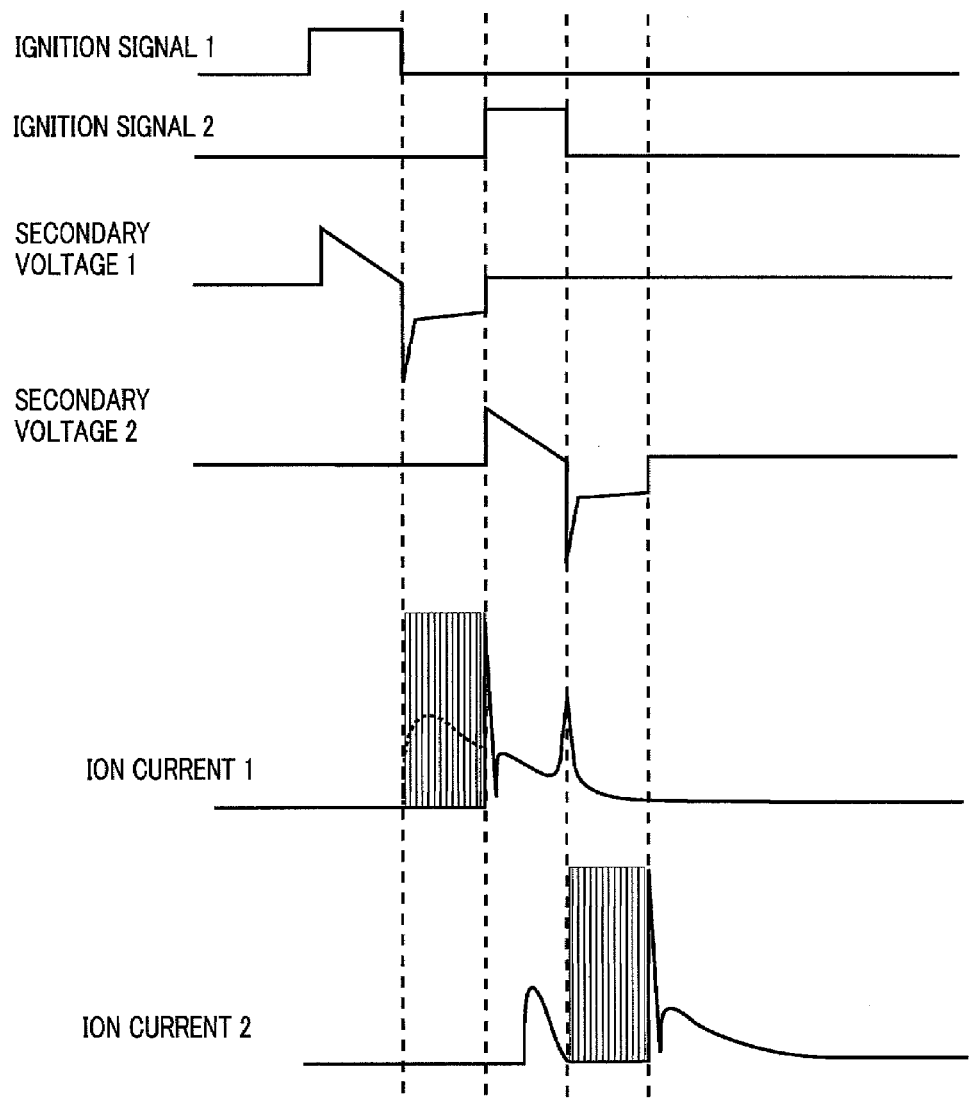
FIG. 6 is a waveform chart for explaining an operation of Embodiment 1 in the case where ignition noise is superimposed.

Accordingly, when pre-ignition or a precursor phenomenon of pre-ignition is produced, ion current information can be more obtained and thereby accurately be detected; because the angle corresponding to the ignition timing for the ignition device 22 is not largely delayed, the combustibility can also be ensured. Additionally, as represented in FIG. 6, the angle corresponding to the ignition timing for the ignition device 22 is more largely delayed, ignition noise in the ignition device 22 is superimposed on an ion current that is detected related to the ignition device 21. In the case where an ion current that is detected related to the ignition device 21 is utilized for misfire detection or knocking detection, the noise is posed as a problem; however, it is also solved.

Next, the operation of the pre-ignition detection device 67 illustrated in FIG. 2 will be explained with reference to FIG. 9. In the step S11, it is ascertained whether or not the occurrence condition determination device 66 has determined that pre-ignition can be produced (it is ascertained whether or not PFI=1); in the case where the condition is satisfied, the step S11 is followed by the step S12. In the case where the condition is not satisfied, the step S11 is followed by "RETURN". In the step S12, it is determined whether or not the present time is after a pre-ignition detection start timing.

Figure 10:
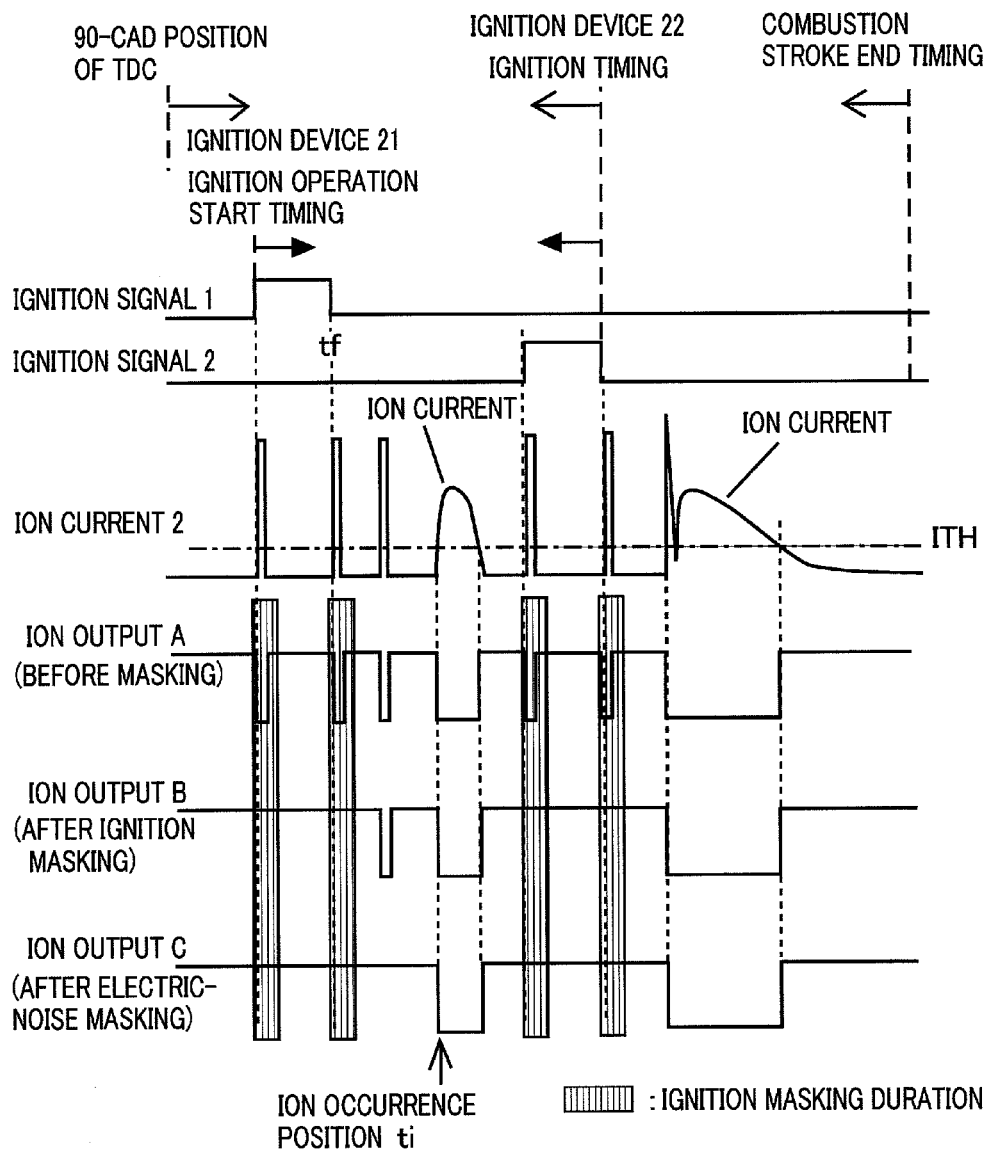
FIG. 10 is a timing chart representing the operation of a pre-ignition detection device utilized in an internal-combustion-engine combustion condition detection apparatus according to Embodiment 1.

It is desirable to set the detection start timing, for example, to the 90-CAD position of the top dead center (a crank-angle position that is 90 degrees before the top dead center), or to an ignition operation start timing for the ignition device 21, as represented in FIG. 10. Meanwhile, in the step S13, it is determined whether or not the present time is after a detection end timing. It is desirable to set the detection end timing to a combustion stroke end timing or the ignition timing for the ignition device 22. It is desirable that a detection range setting device sets, as a detection range (desired duration), an arbitrary range out of the range from the 90-CAD position of the top dead center to the position at which the combustion stroke ends. In addition, it is desirable that the detection range setting device sets, as the detection range, an arbitrary range out of the range from the 90-CAD position of the top dead center to the position corresponding to the ignition timing for the second ignition device. Furthermore, it is desirable that the detection range setting device sets, as the detection range, an arbitrary range out of the range from the ignition operation start position (timing) for the ignition device 21 to the position corresponding to the ignition timing for the second ignition device. In this case, even when no information on the crank angle is obtained, an arbitrary range can be set as the detection range.

In the case where the condition is satisfied in the step S12 and not satisfied in the step S13, i.e., in the detection range set in the detection range setting device, the step S13 is followed by the step S14, where data on the ion current (ion current (t)), of the ignition device 22, at a time instant t is read. In the step S15, it is determined whether or not the ion current (t) is larger than a threshold value ITH that is determined by a driving condition; in the case where the condition is satisfied, the step S15 is followed by the step S16. In contrast, in the case where the foregoing condition is not satisfied in the step S15, the step S15 is followed by the step S19, where the ion output (t) at the time instant t is set to "0". Accordingly, the ion output (t) to which only the processing of the step S15 is applied in the detection range is represented as an ion output A in FIG. 10.

In the step S16, at each of the ignition operation start timings (positions) and the ignition timings for the ignition devices 21 and 22, it is determined whether or not the present time is within an ignition masking duration that is provided for a predetermined duration. The reason for that is that, because, at the ignition operation start timing or at the ignition timing, ignition noise caused by an induction voltage is likely to be superimposed on an ion current signal, it is better to make the pre-ignition detection duration fall outside a predetermined duration (e.g., 200 μs) beginning from the ignition operation start timing or from the ignition timing. In the case where the condition is satisfied, ignition noise is eliminated through the ignition masking, and the ion output (t) is set to "0". After this processing, the ion output (t) in the detection range is represented as an ion output B in FIG. 10. Instead of the ion output (t), an ion current itself may be masked for a predetermined duration beginning from the ignition operation start timing or from the ignition timing.

In addition, it is conceivable that, due to the effects of other ignition devices (other cylinders), ignition noise is superimposed on an ion current; the same processing is applied to that case. Additionally, it is conceivable that electric noise is superimposed during duration other than the predetermined duration after the ignition operation start timing or the ignition timing; therefore, it is desirable to provide an electric noise mask that functions for approximately 100 μs. In this case, the ion output (t) in the detection range is represented as an ion output C in FIG. 10, and the occurrence of an ion current can accurately be detected.

That is to say, an occurrence position detection means that detects the occurrence position of an ion current is provided with an occurrence duration detection means that detects ion occurrence duration and a comparison width setting means that sets a comparison value (e.g., 100 μs) with which occurrence duration detected by the occurrence duration detection means is compared; in the case where the occurrence duration is larger than the comparison value, an ion occurrence position detected by the occurrence position detection means is made effective.

Figure 11:
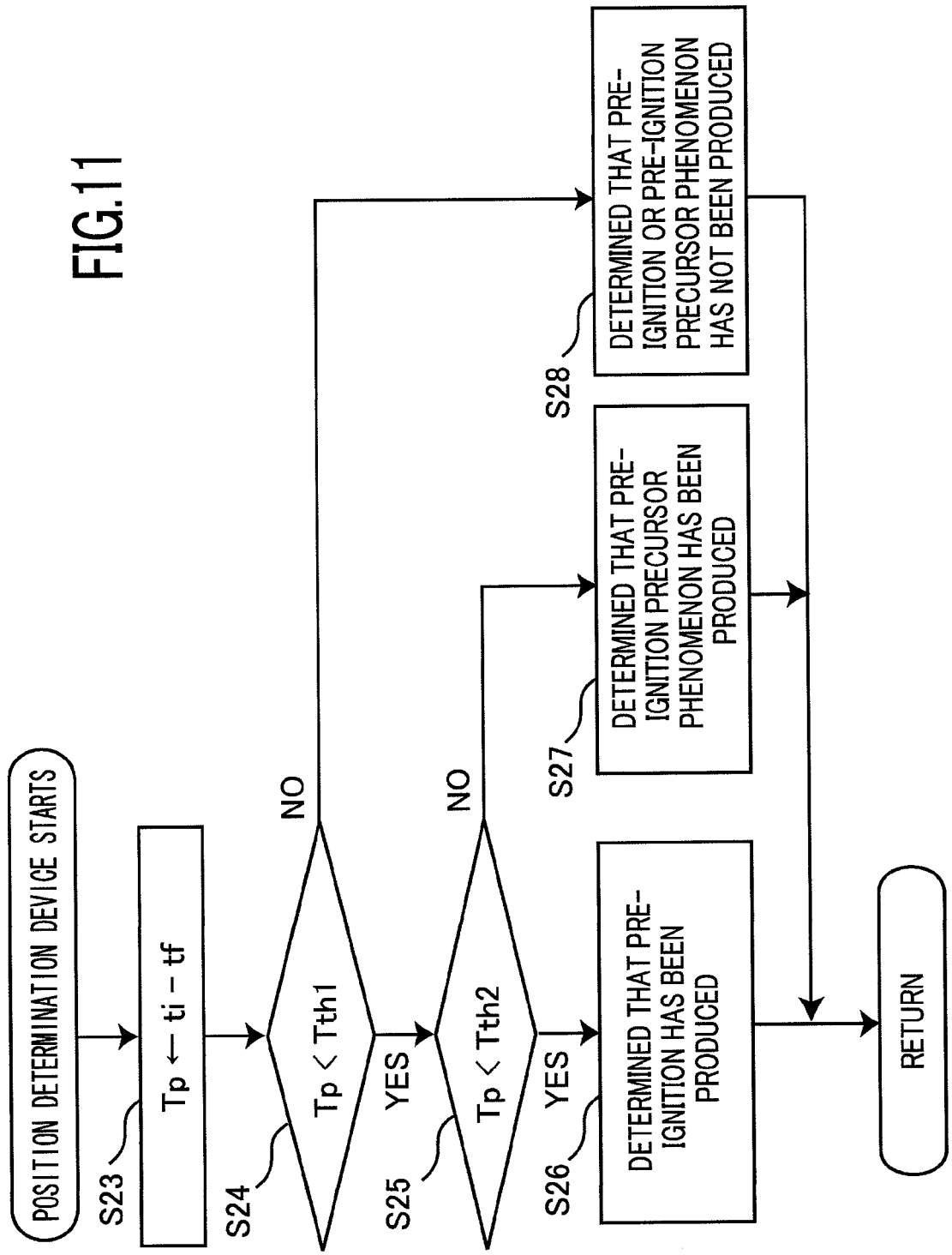
FIG. 11 is a flowchart representing the operation of a position determination device included in a pre-ignition detection device utilized in an internal-combustion-engine combustion condition detection apparatus according to Embodiment 1.

At the detection end timing, i.e., after all the ion output (t) in the detection range is obtained, processing by a position determination device is performed in the step S20. The details of the processing will be explained with reference to FIG. 11. The difference, represented in FIG. 10, between a time instant ti corresponding to the ion occurrence position and a time instant tf corresponding to the ignition timing for the ignition device 21 is calculated in the step S23, and the calculated difference is substituted into a combustion time Tp (the step S23 corresponds to the occurrence position detection means that detects the position of an ion current). In the case where, in the step S24, Tp is larger than a pre-ignition precursor phenomenon occurrence threshold value Tth1, the step S24 is followed by the step S28, where it is determined that no pre-ignition or no precursor phenomenon of pre-ignition has been produced, and then the step S28 is followed by "RETURN". In the case where, in the step S24, Tp is smaller than the pre-ignition precursor phenomenon occurrence threshold value Tth1, the step S24 is followed by the step S25. Furthermore, in the case where Tp is smaller than a pre-ignition occurrence threshold value Tth2, the step S25 is followed by the step S26, where it is determined that pre-ignition has been produced. In contrast, in the case where Tp is larger than the pre-ignition occurrence threshold value Tth2, the step S25 is followed by the step S27, where it is determined that a precursor phenomenon of pre-ignition has been produced.

The pre-ignition precursor phenomenon occurrence threshold value Tth1 and the pre-ignition occurrence threshold value Tth2 may be obtained from the basic ignition timing MAP set based on a driving condition (a comparison position setting means). The more the angles corresponding to the ignition timings of the ignition devices 21 and 22 are advanced, the higher the combustion speed become; therefore, it is required to set the threshold values for determination of pre-ignition and a precursor phenomenon of pre-ignition to values corresponding to angles that are accordingly advanced. As the pre-ignition precursor phenomenon occurrence threshold value Tth1 and the pre-ignition occurrence threshold value Tth2, an average level of Tp may be utilized; alternatively, the pre-ignition precursor phenomenon occurrence threshold value Tth1 and the pre-ignition occurrence threshold value Tth2 may be set by utilizing both the average-level Tp and a value obtained from the basic ignition timing MAP that is set based on a driving condition.

Additionally, determination of the level of a precursor phenomenon of pre-ignition may be performed by providing a plurality of values for determination of a precursor phenomenon of pre-ignition. As a result, the range of pre-ignition suppression control by a pre-ignition suppression device 68 is widened.

The determination of pre-ignition or a precursor phenomenon of pre-ignition may be performed by use of the average value of Tp, a map value that is set for each driving condition, or a covariance value. Accordingly, the determination can be performed not only through a single-cycle state but also through a several-cycle state; thus, the accuracy for pre-ignition determination is enhanced.

Additionally, in Embodiment 1, the determination of pre-ignition or a precursor phenomenon of pre-ignition is performed by use of the combustion time Tp; however, the difference between a crank angle at which an ion current is produced and a crank angle corresponding to the ignition timing for the ignition device 21 may be utilized.

Next, the operation of the pre-ignition suppression device 68 in FIG. 2 will be explained. Based on the result of determination by the pre-ignition detection device 67, the pre-ignition suppression device 68 increases the amount of a fuel to be supplied to a cylinder with regard to which pre-ignition or a precursor phenomenon of pre-ignition has been detected or delays the angle corresponding to an ignition timing. As a result, because the temperature of the inside of the combustion chamber decreases, it is made possible to prevent occurrence of runaway pre-ignition at an extent such that melting loss of an ignition plug or a piston is caused. Moreover, because the detection and the control are performed for each cylinder, a fuel increment can be suppressed to a critical mass, and the torque can be suppressed from decreasing. In addition, in the case where pre-ignition or a precursor phenomenon of pre-ignition is detected, the present condition is a condition under which pre-ignition is likely to be produced; therefore, in order to prevent pre-ignition, pre-ignition suppression control may be applied to each cylinder.

As described above, according to Embodiment 1, under a driving condition in which the combustion in an internal combustion engine is required to be maintained in a good condition, the combustibility is raised, and under a driving condition in which pre-ignition is likely to be produced, the detectability for pre-ignition or a precursor phenomenon of pre-ignition is raised, so that pre-ignition can accurately be suppressed.

Embodiment 2

Figure 12:
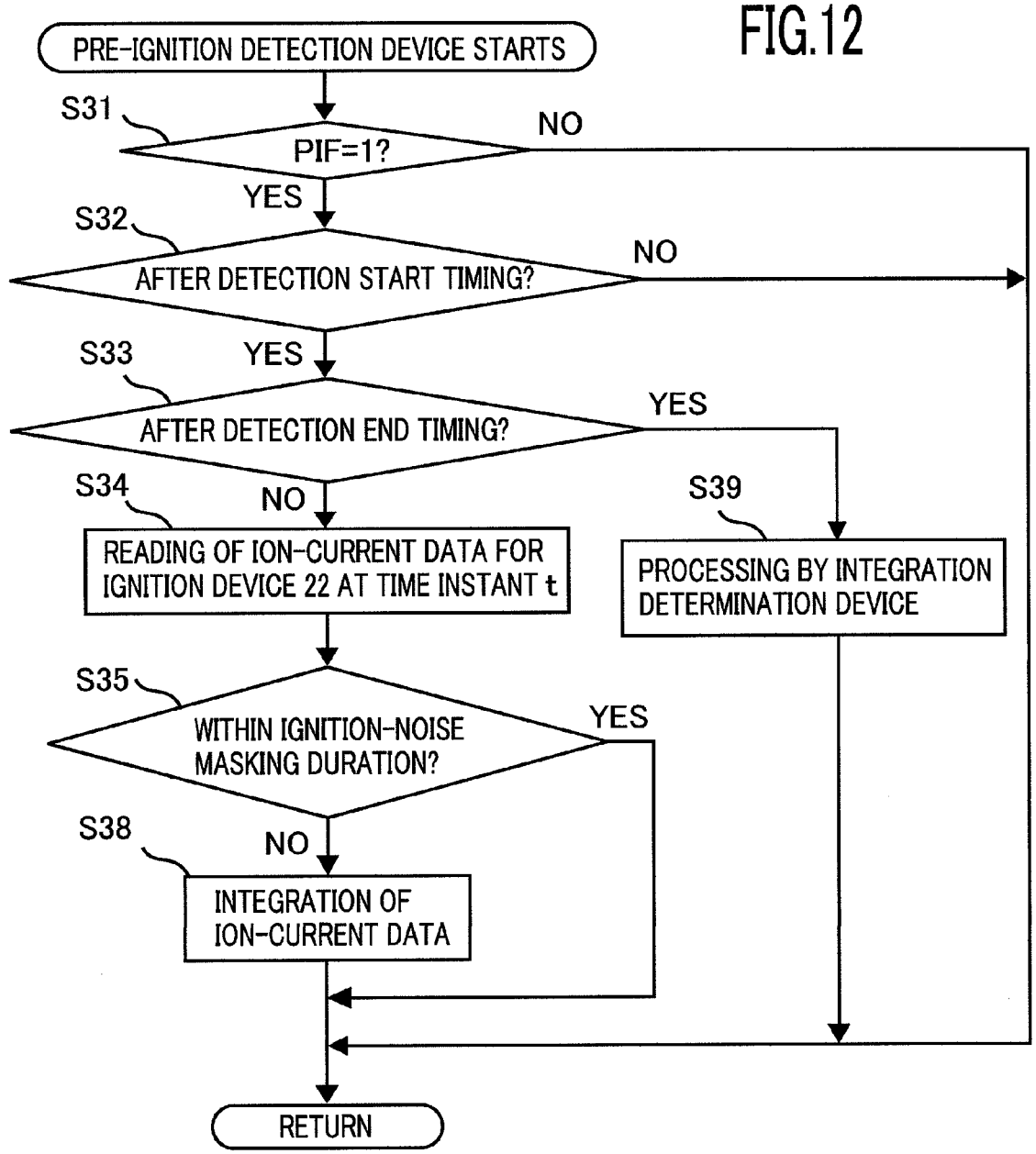
FIG. 12 is a flowchart representing the operation of a pre-ignition detection device utilized in an internal-combustion-engine combustion condition detection apparatus according to Embodiment 2.
Figure 13:
FIG. 13 is a flowchart representing the operation of an integration determination device included in a pre-ignition detection device utilized in an internal-combustion-engine combustion condition detection apparatus according to Embodiment 2.

Although being similar to the configuration of Embodiment 1, however, the configuration of Embodiment 2 is different from that of Embodiment 1 in terms of the operation flow of a pre-ignition detection device 67. The operational flow of the pre-ignition detection device 67 will be explained with reference to FIGS. 12 and 13. In the first place, although being basically similar to the operations in the steps S11 to S13, in FIG. 9, explained in Embodiment 1, the operations in the steps S31 to S33 is different from those in the steps S11 to S13 in terms of the detection end timing. In Embodiment 1, the detection end timing is set to the combustion stroke end timing or the ignition timing for the ignition device 22; however, in Embodiment 2, it is desirable to set the detection end timing to the ignition timing for the ignition device 22. The reason for that is that it is required to detect only a combustion ion produced through ignition by the ignition device 21.

In the case where the conditions is satisfied in each of the steps S31 and S32 but not satisfied in the step S33, the step S33 is followed by the step S34, where data on the ion current (ion current (t)), of the ignition device 22, at a time instant t is read. In the step S35, at each of the ignition operation start timings and the ignition timings for the ignition devices 21 and 22, it is determined whether or not the present time is within an ignition masking duration that is provided for a predetermined duration. In the case where the condition is not satisfied, the step S35 is followed by the step S38, where ion current data integration processing is performed in which an ion current (t) is added to an ion current integration value Iadd that is obtained by integrating an ion current until the time instant t. The accuracy is raised by performing the ion current accumulation value after, as is the case with Embodiment 1, performing electric noise masking.

In the step S35, at each of the ignition operation start timings and the ignition timings for the ignition devices 21 and 22, it is determined whether or not the present time is within the ignition masking duration that is provided for the predetermined duration. The reason for that is that, because, at the ignition operation start timing or at the ignition timing, ignition noise caused by an induction voltage is likely to be superimposed on an ion current signal, it is better to make the pre-ignition detection duration fall outside a predetermined duration (e.g., 200 µs) beginning from the ignition operation start timing or from the ignition timing. In the case where the condition is satisfied, ignition noise is eliminated through the ignition masking, and the ion output (t) is set to "0". After this processing, the ion output (t) in the detection range is represented as an ion output B in FIG. 10.

Instead of the ion output (t), an ion current itself may be masked for a predetermined duration beginning from the ignition operation start timing or from the ignition timing. In addition, it is conceivable that, due to the effects of other ignition devices, ignition noise is superimposed on an ion current; the same processing is applied to that case. Additionally, it is conceivable that electric noise is superimposed during duration other than the predetermined duration beginning from the ignition operation start timing or from the ignition timing; therefore, it is desirable to further provide another electric noise mask that functions for a time period of approximately 100 μs. In this case, the ion output (t) in the detection range is represented as an ion output C in FIG. 10, and an occurrence amount of an ion current can accurately be detected.

As is the case with Embodiment 1, at the detection end timing, i.e., after the ion current integration value Iadd in the detection range is obtained, processing by an integration determination device is performed in the step S39. The operation of the integration determination device will be explained with reference to FIG. 13. In the case where, in the step S45, the ion current integration value Iadd is smaller than a pre-ignition precursor phenomenon occurrence threshold value Ith1, the step S45 is followed by the step S49, where it is determined that no pre-ignition or no precursor phenomenon of pre-ignition has been produced, and then the step S49 is followed by "RETURN". In the case where, in the step S45, Iadd is smaller than the pre-ignition precursor phenomenon occurrence threshold value Ith1, the step S45 is followed by the step S46. Furthermore, in the case where Iadd is larger than a pre-ignition occurrence threshold value Ith2, the step S46 is followed by the step S47, where it is determined that pre-ignition has been produced. In contrast, in the case where Iadd is smaller than Ith2, the step S46 is followed by the step S48, where it is determined that a precursor phenomenon of pre-ignition has been produced.

The pre-ignition precursor phenomenon occurrence threshold value Ith1 and the pre-ignition occurrence threshold value Ith2 may be obtained from the basic ignition timing MAP set based on a driving condition. As the pre-ignition precursor phenomenon occurrence threshold value Ith1 and the pre-ignition occurrence threshold value Ith2, an average level of the ion current integration value Iadd may be utilized; alternatively, the pre-ignition precursor phenomenon occurrence threshold value Ith1 and the pre-ignition occurrence threshold value Ith2 may be set by utilizing both the average-level ion current integration value Iadd and a value obtained from the basic ignition timing MAP that is set based on a driving condition.

Additionally, determination of the level of a precursor phenomenon of pre-ignition may be performed by providing a plurality of values for determination of a precursor phenomenon of pre-ignition. As a result, the range of pre-ignition suppression control by a pre-ignition suppression device 68 is widened.

The determination of pre-ignition or a precursor phenomenon of pre-ignition may be performed by use of the average value of the ion current integration value Iadd, a map value that is set for each driving condition, or a covariance value. Accordingly, the determination can be performed not only through a single-cycle state but also through a several-cycle state; thus, the accuracy for pre-ignition determination is enhanced.

As described above, according to Embodiment 2, the detectability for pre-ignition or a precursor phenomenon of pre-ignition is raised; therefore, pre-ignition can accurately be suppressed.

Embodiment 3

In Embodiment 1, an ion current detected in the ignition device 22 is inputted to the ECU 42, and pre-ignition detection is performed in the ECU 42; however, in Embodiment 3, an ion current is processed in an ion current shaping circuit 43 in the ignition device 22, and then the ion output A, the ion output B, or the ion output C represented in FIG. 10 is outputted. In the case where the ignition device 22 outputs the ion output A or the ion output B, masking during a predetermined duration beginning from the ignition operation start timing or from the ignition timing and masking for electric noise are performed in the ECU, as is the case with Embodiment 1. In contrast, in the case where the ignition device 22 outputs the ion output C, masking during a predetermined duration beginning from the ignition operation start timing or from the ignition timing and masking for electric noise are performed in the ignition device 22.

As described above, in Embodiment 3, because pre-ignition detection processing is performed in the ignition device 22 and pulse shaping processing is performed as represented in FIG. 10, interfaces for inputting an ion current and the A/D converter of a microcomputer utilized for calculation processing operations are not required in the ECU 42, whereby a processing load of the microprocessor is reduced, and the detectability for pre-ignition or a precursor phenomenon of pre-ignition is raised, whereby pre-ignition can accurately be suppressed.

Embodiment 4

Figure 16:
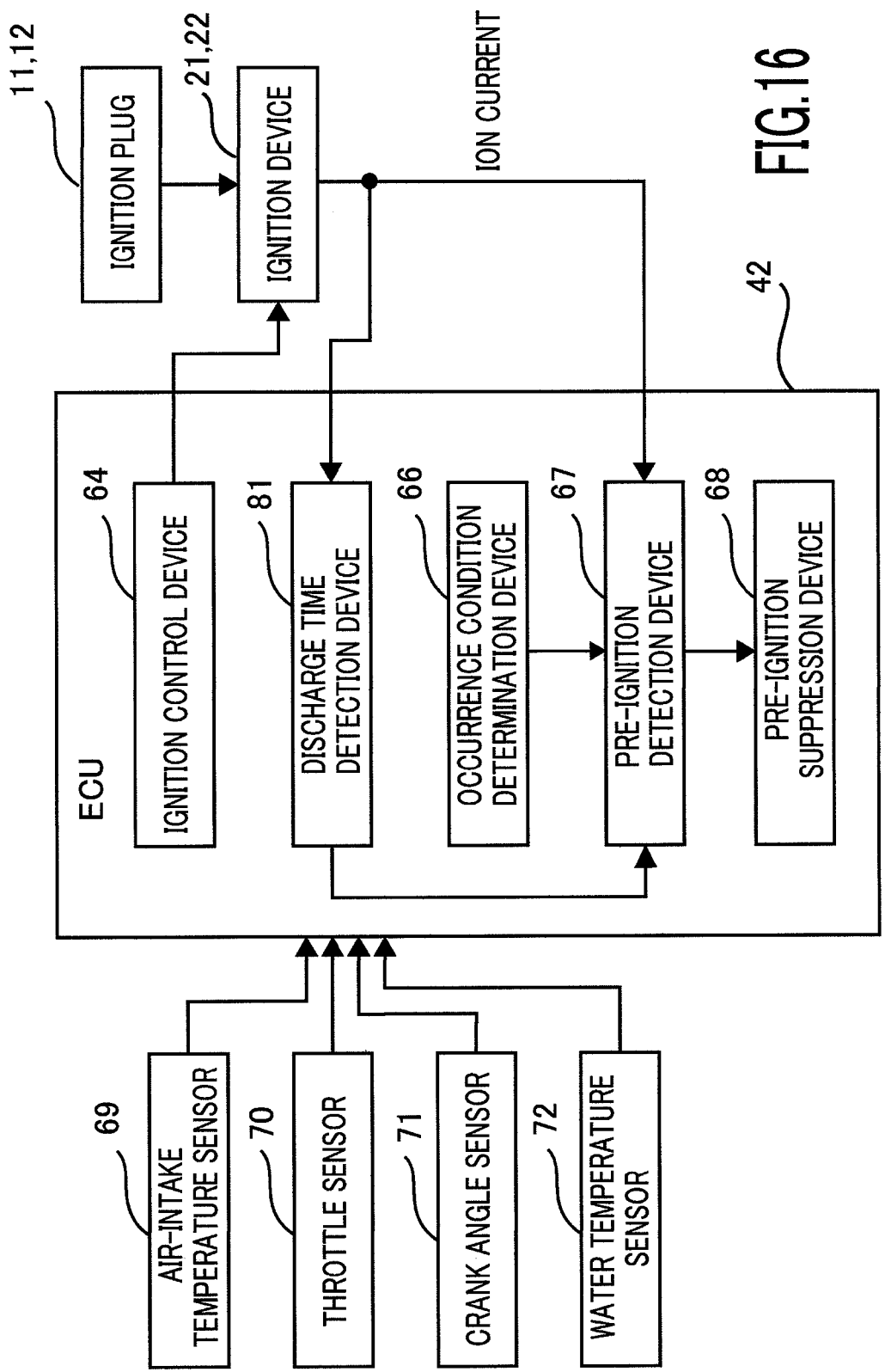
FIG. 16 is a functional configuration diagram illustrating an internal-combustion-engine combustion condition detection apparatus according to Embodiment 4.

Although having approximately the same configuration as Embodiment 1, Embodiment 4 includes a discharge time detection device 81, as illustrated in FIG. 16. In Embodiment 4, a discharge time is measured by use of the discharge time detection device 81.

Additionally, in Embodiment 1, under a driving condition in which it is determined by the occurrence condition determination device 66 that pre-ignition can be produced, by delaying the angle corresponding to the ignition timing for the ignition device 21 with respect to the ignition device 21, the time of flame propagation due to ignition through the ignition plug 11 is measured, as represented in FIG. 4, based on the ion current I2a detected in the ignition plug 12; however, in Embodiment 4, the angle corresponding to the ignition timing for the ignition device 22 is not delayed, and the ignition devices 21 and 22 are made to perform in phase ignition. Alternatively, a state maybe maintained in which the angle corresponding to the ignition timing for the ignition device 22 is slightly delayed with respect to the angle corresponding to the ignition timing for the ignition device 21. Additionally, at least one of the ignition devices 21 and 22 may include the ion-current detection device 41 illustrated in FIG. 1. Additionally, only a single ignition device may be provided.

Under a driving condition in which pre-ignition or a precursor phenomenon of pre-ignition is produced, the pressure in the combustion chamber is extremely high. It is known that, according to Paschen's law, the voltage at which a spark discharge is produced between two parallel electrodes is a function of the multiplication product of the gas pressure and the distance between the electrodes; the higher the gas pressure is, the higher is the voltage required to maintain the discharge. Accordingly, when pre-ignition or a precursor phenomenon of pre-ignition is produced, the voltage required is high; therefore, it is likely to become more difficult than normal to maintain a discharge, i.e., a discharge time is likely to become shorter. Accordingly, in Embodiment 4, it is desirable that, under a driving condition in which it is determined by the occurrence condition determination device 66 that pre-ignition is likely to be produced, at least one of respective discharge times in the ignition devices 21 and 22 is measured so that pre-ignition or a precursor phenomenon of pre-ignition is detected. As a result, while the combustibility is raised through the in phase ignition by the ignition devices 21 and 22, pre-ignition or a precursor phenomenon of pre-ignition can be detected.

Figure 3:
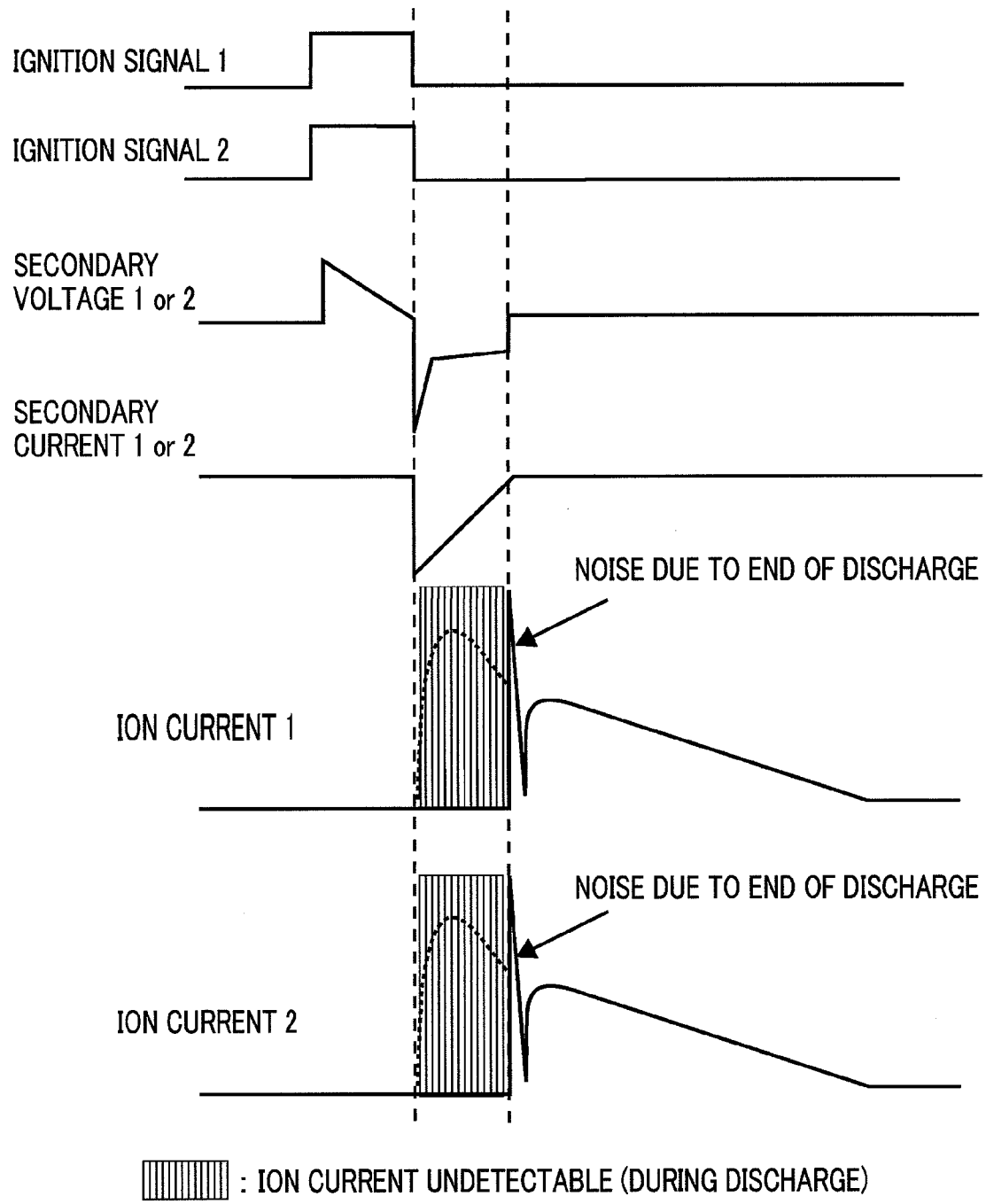
FIG. 3 is a waveform chart for explaining an operation of Embodiment 1 in the case of in phase ignition.
Figure 14:
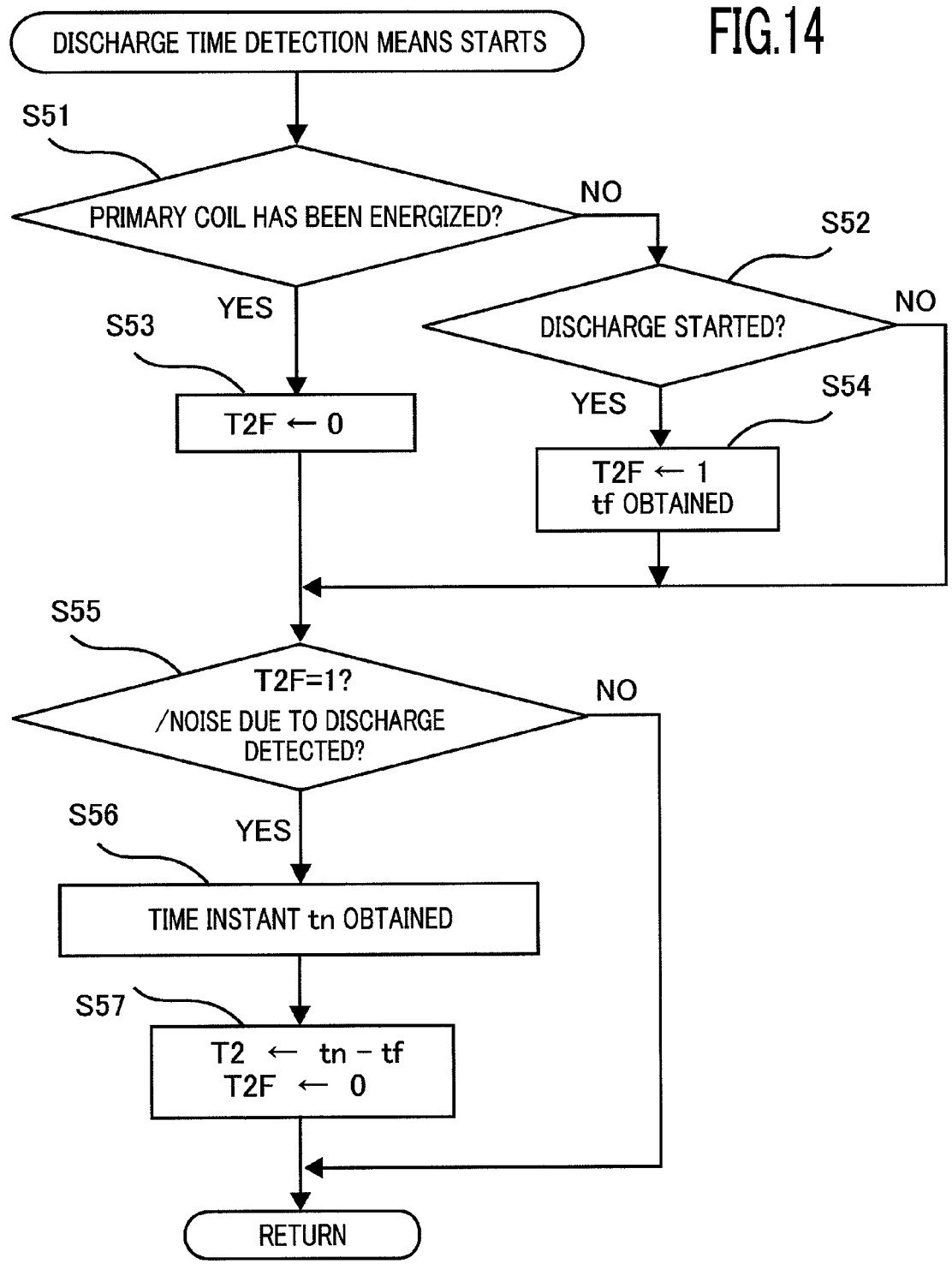
FIG. 14 is a flowchart representing the operation of a discharge time detection device utilized in an internal-combustion-engine combustion condition detection apparatus according to Embodiment 4.

The operation of the discharge time detection device 81 according to Embodiment 4 will be explained with reference to FIG. 14. In the step S51, it is determined whether or not the primary coil has been energized (ignition has been started); in the case where the condition is satisfied, the step S51 is followed by the step S53, where a discharge time detection permission flag T2F is cleared to "0". In contrast, the primary coil is de-energized in the step S51, the step S51 is followed by the step s52, where it is determined whether or not a discharge had been started (the present time instant is the ignition timing); in the case where the condition is satisfied, the step S52 is followed by the step S54, where the discharge time detection permission flag T2F is set to "1" and a time instant tf at which a discharge starts (ignition timing) is obtained. Next, it is determined in the step S55 whether or not the discharge time detection permission flag T2F is "1" and noise, as represented in FIG. 3, due to the completion of the discharge has been detected; in the case where the condition is satisfied, the step S55 is followed by the step S56, where that time instant tn is obtained. After that, the step S56 is followed by the step S57, where the difference between the time instant tn and the time instant tf corresponding to the ignition timing is calculated and substituted into a discharge time T2, and then the discharge time detection permission flag T2F is cleared to "0". In addition, the secondary current that flows through the secondary coil during a discharge time or the secondary voltage as represented in FIG. 3 may be utilized for measuring the time instant tn.

Figure 15:
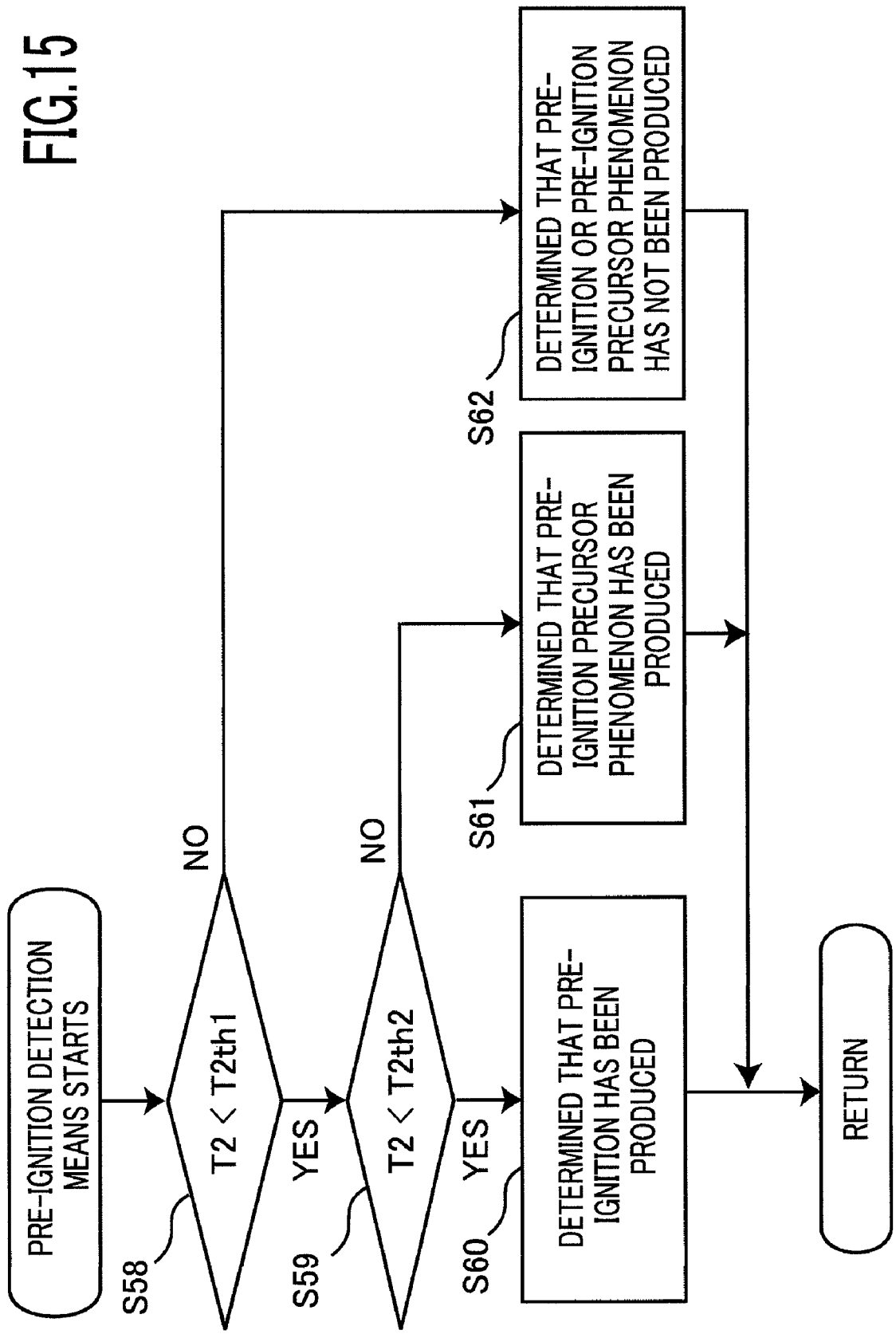
FIG. 15 is a flowchart representing the operation of a pre-ignition detection device utilized in an internal-combustion-engine combustion condition detection apparatus according to Embodiment 4.

When the discharge time T2 is detected by the discharge time detection device 81, it is determined by the pre-ignition detection device 67 whether or not pre-ignition or a precursor phenomenon of pre-ignition has been produced. The operation of the pre-ignition detection device 67 will be explained with reference to FIG. 15. In the case where, in the step S58, T2 is larger than a pre-ignition precursor phenomenon occurrence threshold value T2th1, the step S58 is followed by the step S62, where it is determined that no pre-ignition or no precursor phenomenon of pre-ignition has been produced, and then the step S62 is followed by "RETURN". In the case where, in the step S58, T2 is smaller than the pre-ignition precursor phenomenon occurrence threshold value T2th1, the step S58 is followed by the step S59. Furthermore, in the case where T2 is smaller than a pre-ignition occurrence threshold value T2th2, the step S59 is followed by the step S60, where it is determined that pre-ignition has been produced (a discharge determination means). In contrast, in the case where T2 is larger than the pre-ignition occurrence threshold value T2th2, the step S59 is followed by the step S61, where it is determined that a precursor phenomenon of pre-ignition has been produced (the discharge determination means).

A comparison level setting means may obtain the pre-ignition precursor phenomenon occurrence threshold value T2th1 and the pre-ignition occurrence threshold value T2th2 from the basic ignition timing MAP set based on a driving condition. As the pre-ignition precursor phenomenon occurrence threshold value T2th1 and the pre-ignition occurrence threshold value T2th2, an average level of T2 may be utilized; alternatively, the pre-ignition precursor phenomenon occurrence threshold value T2th1 and the pre-ignition occurrence threshold value T2th2 may be set by utilizing both the average-level T2 and a value obtained from the basic ignition timing MAP that is set based on a driving condition.

Additionally, determination of the level of a precursor phenomenon of pre-ignition may be performed by providing a plurality of values for determination of a precursor phenomenon of pre-ignition.

The determination of pre-ignition or a precursor phenomenon of pre-ignition may be performed by use of the average value of T2, a map value that is set for each driving condition, or a covariance value. Accordingly, the determination can be performed not only through a single-cycle state but also through a several-cycle state; thus, the accuracy for pre-ignition determination is enhanced.

Additionally, in Embodiment 4, the determination of pre-ignition or a precursor phenomenon of a pre-ignition is performed by use of the discharge time T2; however, the determination may be performed through conversion into an angle.

As described above, according to Embodiment 4, the combustion condition of an internal combustion engine can accurately be comprehended. Moreover, even under a driving condition in which it is determined that pre-ignition is likely to be produced, pre-ignition or a precursor phenomenon of pre-ignition can be detected without delaying the angle corresponding to the ignition timing for the ignition device 22; therefore, deterioration in the combustibility can be prevented.

An internal-combustion-engine combustion condition detection apparatus according to the present invention is mounted on a vehicle, a two-wheeled vehicle, an outboard engine, a special machine, or the like utilizing an internal combustion engine and utilized to raise the driving efficiency of the internal combustion engine and to maintain the environment through reduction of emissions.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An internal-combustion-engine combustion condition detection apparatus comprising:
    first and second ignition devices each having an ignition plug that ignites a fuel-air mixture taken in for performing combustion when an internal combustion engine is operated, the first ignition device including a first ignition plug that causes main combustion in a combustion chamber, and the second ignition device including a second ignition plug that is disposed in the same combustion chamber as the first ignition plug of the first ignition device, spaced apart from the first ignition plug;
    an ignition control device that generates a control signal for controlling operations of the ignition devices;
    an ion-current detection device that detects an ion current generated during combustion; and
    a pre-ignition detection device that detects pre-ignition or a precursor phenomenon of pre-ignition, based on an ion current detected by the ion-current detection device, wherein the ion-current detection device detects a combustion ion current that is generated in the second ignition device regardless of whether or not ignition is performed by the second ignition device, thereby detecting pre-ignition or the precursor phenomenon of pre-ignition.

2. The internal-combustion-engine combustion condition detection apparatus according to claim 1, wherein the ignition control device controls an ignition timing for the second ignition device to be within a range in which the second ignition device does not contribute to combustion.

3. The internal-combustion-engine combustion condition detection apparatus according to claim 1, wherein the ignition control device controls an ignition timing for the second ignition device to be after an ignition timing for the first ignition device, to make the second ignition device contribute to combustion, and to be delayed with respect to a time instant at which the precursor phenomenon of pre-ignition produces a combustion ion.

4. The internal-combustion-engine combustion condition detection apparatus according to claim 1, wherein the ignition control device includes an occurrence condition determination device that determines whether a present driving condition is a driving condition under which pre-ignition can be produced, and in the case where the occurrence condition determination device determines that a present driving condition is a driving condition under which pre-ignition can be produced, the ignition control device delays an ignition timing for the second ignition device with respect to an ignition timing for the first ignition device.

5. The internal-combustion-engine combustion condition detection apparatus according to claim 1, wherein the ignition control device includes an occurrence condition determination device that determines whether a present driving condition is a driving condition under which pre-ignition can be produced, and in the case where the occurrence condition determination device determines that a present driving condition is a driving condition under which pre-ignition can be produced, the ignition control device controls an ignition timing for the second ignition device to be within a range in which the second ignition device does not contribute to combustion.

6. The internal-combustion-engine combustion condition detection apparatus according to claim 1, wherein the ignition control device includes an occurrence condition determination device that determines whether a present driving condition is a driving condition under which pre-ignition can be produced, and in the case where the occurrence condition determination device determines that the present driving condition is a driving condition under which pre-ignition can be produced, the ignition control device controls an ignition timing for the second ignition device to be after an ignition timing for the first ignition device, to make the second ignition device contribute to combustion, and to be delayed with respect to a time instant at which the precursor phenomenon of pre-ignition produces a combustion ion.

7. The internal-combustion-engine combustion condition detection apparatus according to claim 1, wherein the ignition control device includes an occurrence condition determination device that determines whether a present driving condition is a driving condition under which pre-ignition can be produced, and in the case where the occurrence condition determination device does not determine that the present driving condition is a driving condition under which pre-ignition can be produced, the ignition control device prohibits operation of delaying an angle corresponding to an ignition timing for the second ignition device with respect to an angle corresponding to an ignition timing for the first ignition device.

8. The internal-combustion-engine combustion condition detection apparatus according to claim 1, wherein the ignition control device includes an occurrence condition determination device that determines whether a present driving condition is a driving condition under which pre-ignition can be produced, and in the case where the occurrence condition determination device does not determine that a present driving condition is a driving condition under which pre-ignition can be produced, the ignition control device prohibits at least one of the following operations:

(1) Detection by the pre-ignition detection device;

(2) Control of an ignition timing for the second ignition device to be within a range in which the second ignition device does not contribute to combustion; and (3) Control of an ignition timing for the second ignition device to be after ignition timing for the first ignition device, to make the second ignition device contribute to combustion, and to be delayed with respect to a time instant at which the precursor phenomenon of pre-ignition produces a combustion ion.

9. The internal-combustion-engine combustion condition detection apparatus according to claim 1, the pre-ignition detection device comprising:

an occurrence position detection means for detecting an ion-current occurrence position;

a comparison position setting means for setting a comparison position to be compared with an ion-current occurrence position detected by the occurrence position detection means; and a position determination device that compares a comparison position set by the comparison position setting means with an ion-current occurrence position detected by the occurrence position detection means, and determines whether or not pre-ignition or the precursor phenomenon of pre-ignition has been produced, wherein, in the case where the ion-current occurrence position is advanced with respect to the comparison position, the position determination device determines that pre-ignition or the precursor phenomenon of pre-ignition has been produced.

10. The internal-combustion-engine combustion condition detection apparatus according to claim 9, the occurrence position detection means that detects an ion-current occurrence position comprising:

an occurrence duration detection means that detects an ion occurrence duration; and a comparison width setting means that sets a comparison value to be compared with an ion occurrence duration detected by the occurrence duration detection means, wherein, in the case where the occurrence duration is larger than the comparison value, an ion-current occurrence position detected by the occurrence position detection means is made effective.

11. The internal-combustion-engine combustion condition detection apparatus according to claim 1, wherein the pre-ignition detection device masks at least one of respective noise signals produced at an ignition operation start position and at an ignition timing for the ignition device so that the masked noise signal is not dealt with as an ion current produced through combustion.

12. An internal-combustion-engine combustion condition detection apparatus comprising:

first and second ignition devices each having an ignition plug that ignites a fuel-air mixture taken in for performing combustion when an internal combustion engine is operated, the first ignition device including a first ignition plug that causes main combustion in a combustion chamber, and the second ignition device including a second ignition plug that is disposed in the same combustion chamber as the first ignition plug of the first ignition device, spaced apart from the first ignition plug;

an ignition control device that generates a control signal for controlling operations of the ignition devices;

an ion-current detection device that detects an ion current generated during combustion;

a detection range setting device that sets an ion-current detection range; and a pre-ignition detection device that detects pre-ignition or a precursor phenomenon of pre-ignition, based on an ion current detected by the ion-current detection device, the ion current being within a detection range set by the detection range setting device, wherein the ion-current detection device detects a combustion ion current that is generated in the second ignition device regardless of whether or not ignition is performed by the second ignition device, thereby detecting pre-ignition or the precursor phenomenon of pre-ignition.

13. The internal-combustion-engine combustion condition detection apparatus according to claim 12, wherein the detection range setting device sets, as a detection range, a desired range from a 90-CAD position of the top dead center to a crank-angle position at which a combustion stroke ends.

14. The internal-combustion-engine combustion condition detection apparatus according to claim 12, wherein the detection range setting device sets, as a detection range, a desired range from the 90-CAD position of the top dead center to a crank angle position corresponding to an ignition timing for the second ignition device.

15. The internal-combustion-engine combustion condition detection apparatus according to claim 12, wherein the detection range setting device sets, as a detection range, a desired range from an ignition operation start position for the first ignition device to a position corresponding to an ignition timing for the second ignition device.

16. The internal-combustion-engine combustion condition detection apparatus according to claim 12, the pre-ignition detection device comprising:

an integration means that calculates an integration value of an ion current in a detection range set by the detection range setting device;

a comparison value setting means that sets a comparison value to be compared with an integration value integrated by the integration means; and an integration determination device that compares a comparison value set by the comparison value setting means with an integration value integrated by the integration means, and determines whether or not pre-ignition or the precursor phenomenon of pre-ignition has been produced, wherein, in the case where an integration value integrated by the integration means is larger than the comparison value, the integration determination device determines that pre-ignition or the precursor phenomenon of pre-ignition has been produced.

17. An internal-combustion-engine combustion condition detection apparatus comprising:

first and second ignition devices each having an ignition plug that ignites a fuel-air mixture taken in for performing combustion when an internal combustion engine is operated, the first ignition device including a first ignition plug that causes main combustion in a combustion chamber, and the second ignition device including a second ignition plug that is disposed in the same combustion chamber as the first ignition plug of the first ignition device, spaced apart from the first ignition plug;

an ignition control device that generates a control signal for controlling operations of the ignition devices;

a discharge time detection device that detects a spark discharge time of a spark produced upon combustion through the ignition device;

a comparison level setting means for setting a comparison level to be compared with a spark discharge time detected by the discharge time detection device; and a discharge determination means for determining whether or not pre-ignition or a precursor phenomenon of pre-ignition has been produced, based on the result of a comparison between the spark discharge time and the comparison level, wherein the discharge time detection device detects an spark discharge time of a spark produced by the first ignition device or the second ignition device, and in the case where the spark discharge time detected by the discharge time detection device is shorter than the comparison level, the discharge determination means determines that pre-ignition or the precursor phenomenon of pre-ignition has been produced.

18. The internal-combustion-engine combustion condition detection apparatus according to claim 17, wherein the first ignition plug of the first ignition device performs ignition in the same phase as the second ignition plug of the first ignition device does.

* * * * *